US010990735B2

(12) United States Patent
Bhowmick et al.

(10) Patent No.: US 10,990,735 B2
(45) Date of Patent: Apr. 27, 2021

(54) SYSTEM AND METHOD FOR GENERATING A CLUSTER-BASED POWER ARCHITECTURE USER INTERFACE

(71) Applicant: Synopsys, Inc., Mountain View, CA (US)

(72) Inventors: Sauresh Bhowmick, Bangalore (IN); Bhaskar Pal, Bangalore (IN); Esha Dutta, Bangalore (IN); Harsha Vardhan, Bangalore (IN)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 16/882,671

(22) Filed: May 25, 2020

(65) Prior Publication Data
US 2020/0372196 A1 Nov. 26, 2020

(30) Foreign Application Priority Data
May 25, 2019 (IN) .............................. 201911020779

(51) Int. Cl.
G06F 17/50 (2006.01)
G06F 30/333 (2020.01)
(Continued)

(52) U.S. Cl.
CPC ........ *G06F 30/333* (2020.01); *G06F 3/04847* (2013.01); *G06F 11/3466* (2013.01); *G06F 30/398* (2020.01); *G06F 30/33* (2020.01)

(58) Field of Classification Search
CPC ............. G06F 11/3466; G06F 3/04847; G06F 30/333; G06F 30/33; G06F 30/398
(Continued)

(56) References Cited

U.S. PATENT DOCUMENTS 8,683,419 B1 * 3/2014 Hines .................... G06F 30/327
716/133
9,201,994 B1 * 12/2015 Tripathi .................. G06F 30/30
(Continued)

FOREIGN PATENT DOCUMENTS

EP 3246861 A1 4/2017

OTHER PUBLICATIONS

Hardee et al., "Choosing the Right Verification Technology for CDC-Clean RTL Signoff," Cadence, www.cadence.com, (May 17, 2017).

Primary Examiner — Phallaka Kik
(74) Attorney, Agent, or Firm — Alston & Bird LLP

(57) ABSTRACT

A system and method generates cluster-based power architecture interfaces for an integrated circuit (IC) design under test (DUT) debugging by receiving design data for an IC DUT, determining power characteristic data for the IC DUT, generating display components within a graphical user interface (GUI) corresponding to individual components encompassed within a power intent hierarchy corresponding with the IC DUT, generating graphical links between displayed components, overlaying interactive elements corresponding with generated violation clusters over graphical links, and providing root-cause interactive elements within the generated GUI having visual associations with the interactive components corresponding with particular violation clusters.

21 Claims, 24 Drawing Sheets

(51) Int. Cl.
  *G06F 11/34*     (2006.01)
  *G06F 3/0484*    (2013.01)
  *G06F 30/398*    (2020.01)
  *G06F 30/33*     (2020.01)

(58) Field of Classification Search
  USPC .......................... 716/106, 111, 136; 703/16
  See application file for complete search history.

(56) References Cited

U.S. PATENT DOCUMENTS

| | | | |
|---|---|---|---|
| 10,289,798 | B1 | 5/2019 | Nunes Barcelos et al. |
| 10,311,192 | B2 * | 6/2019 | Venkatesh .............. G06F 30/398 |
| 10,599,797 | B1 * | 3/2020 | Hanna ................. G06F 30/3323 |
| 2004/0248576 | A1 * | 12/2004 | Ghiglino ................. H04L 45/12 |
| | | | 455/445 |
| 2007/0245285 | A1 * | 10/2007 | Wang .................... G06F 30/327 |
| | | | 716/104 |
| 2011/0161900 | A1 * | 6/2011 | Ginetti .................... G06F 30/33 |
| | | | 716/106 |
| 2012/0198408 | A1 * | 8/2012 | Chopra ............... G06F 30/3323 |
| | | | 716/127 |
| 2015/0178417 | A1 * | 6/2015 | Tu ......................... G06F 30/327 |
| | | | 716/105 |
| 2017/0011138 | A1 * | 1/2017 | Venkatesh ............. G06F 30/327 |
| 2017/0228481 | A1 * | 8/2017 | Pusuluri ................ G06F 30/394 |

\* cited by examiner

SYSTEM AND METHOD FOR GENERATING A CLUSTER-BASED POWER ARCHITECTURE USER INTERFACE

CROSS-REFERENCE TO RELATED APPLICATIONS

This patent application claims priority to Indian Patent Appl. No. IN201911020779, filed May 25, 2019, which is incorporated herein by reference in its entirety.

TECHNICAL FIELD

The present disclosure is generally related to a verification system. In particular, the present disclosure is related to a system and method for generating a cluster-based power architecture user interface.

BACKGROUND

Static verification tools are used by a user to check correctness of various aspects like low power, asynchronous clocks, functionality and style and structure of IC (integrated circuit) Designs Under Test (DUTs). The design complexity on which verification tools run can range from moderate complexity to high complexity (e.g., the number of gates within an IC DUT can vary from thousands to millions). Depending on the complexity of the IC DUT, verification tools can generate reports containing a huge volume (in order of millions) of design violations for a user to address.

Certain advanced graphical user interface (GUI) tools enable users to visualize and debug low power design issues. Currently, users of certain tools can visualize only one error/violation at a time. Existing GUI tools do not have the capability to show data representative of multiple errors and their relationship simultaneously. Hence, existing GUI tools are not configured to visualize high-level design issue(s), which results in higher consumption of more verification cycles for design convergence.

SUMMARY

Various embodiments are directed to a system for generating a cluster-based power architecture interface. In certain embodiments, the system includes: a memory storage device; a processor configured to: receive design data for an integrated circuit (IC) design; determine, based at least in part on the design data, power characteristic data for the IC design, wherein the power characteristic data identifies a power intent hierarchy for the IC design and violations present within the IC design; generate within a graphical user interface (GUI), display components corresponding to individual components encompassed within the power intent hierarchy; generate, within the GUI and based at least in part on the design data, one or more graphical links between displayed components; generate, based at least in part on the power characteristic data for the IC design, one or more violation clusters each including a plurality of design violations for the IC design, wherein design violations within each of the one or more violation clusters are characterized as having at least one shared root cause; associate the one or more violation clusters with the one or more graphical links; overlay a plurality of interactive elements over the GUI, wherein the plurality of interactive elements include: at least one interactive link element providing data indicative of the one or more violation clusters in association with corresponding ones of the one or more graphical links; at least one root-cause element corresponding to the at least one shared root cause; and a graphical association between the at least one interactive link element and the at least one root-cause element to indicate a relationship between the at least one root-cause element and the at least one interactive link element.

In various embodiments, the at least one interactive link element has associated detail data indicative of individual violations within a violation cluster, and wherein the processor is configured to: upon receipt of input indicating interaction with a first interactive element, display a detail element within the GUI including at least a portion of the detail data. Moreover, the detail data may include a plurality of interactive links associated with individual violations within the violation cluster, and wherein the processor is additionally configured to: upon receipt of input indicating interaction with an interactive link associated with a first individual violation, display a detail-view GUI providing a violation-specific schematic associated with the first individual violation. In certain embodiments, the display components include source components and sink components; and each of the one or more graphical links directly links at least one source component with at least one sink component. In various embodiments, the at least one root-cause element includes primary root-cause elements and secondary root-cause elements, and wherein at least one primary root-cause element is visually linked with at least one secondary root-cause element to demonstrate the at least one primary root-cause element being a cause of the at least one secondary root-cause element. Moreover, in certain embodiments, the GUI includes the display components in a hierarchical arrangement, wherein display components corresponding to individual components are displayed within one of a common source parent boundary or a common sink parent boundary, and wherein the GUI displays the common source parent boundary and the common sink parent boundary within a common parent boundary. In various embodiments, determining power characteristic data for the IC DUT includes generating a tabular power characteristic reference table for each violation cluster; and overlaying a plurality of interactive elements over the GUI includes generating the at least one interactive link element based at least in part on the tabular power characteristic reference table for each cluster.

Certain embodiments are directed to a computer-implemented method for generating a cluster-based power architecture interface. In various embodiments, the method including: receiving, via one or more processors, design data for an integrated circuit (IC) design; determining, based at least in part on the design data, power characteristic data for the IC design, wherein the power characteristic data identifies a power intent hierarchy for the IC design and violations present within the IC design; generating within a graphical user interface (GUI), display components corresponding to individual components encompassed within the power intent hierarchy; generating, within the GUI and based at least in part on the design data, one or more graphical links between displayed components; generating, based at least in part on the power characteristic data for the IC design, one or more violation clusters each including a plurality of design violations for the IC design, wherein design violations within each of the one or more violation clusters are characterized as having at least one shared root cause; associating the one or more violation clusters with the one or more graphical links; overlaying a plurality of interactive elements over the GUI, wherein the plurality of interactive elements include: at least one interactive link element providing data indicative of the one or more violation clusters in association with corresponding ones of the one or more graphical links; at least one root-cause element corresponding to the at least one shared root cause; and a graphical association between the at least one interactive link element and the at least one root-cause element to indicate a relationship between the at least one root-cause element and the at least one interactive link element.

In certain embodiments, the at least one interactive link element has associated detail data indicative of individual violations within a violation cluster, and wherein the method further includes: upon receipt of input indicating interaction with a first interactive element, displaying a detail element within the GUI including at least a portion of the detail data. In various embodiments, the detail data includes a plurality of interactive links associated with individual violations within the violation cluster, and wherein the method further includes: upon receipt of input indicating interaction with an interactive link associated with a first individual violation, displaying a detail-view GUI providing a violation-specific schematic associated with the first individual violation. Moreover, in certain embodiments, the display components include source components and sink components; and each of the one or more graphical links directly links at least one source component with at least one sink component. In various embodiments, the at least one root-cause element includes primary root-cause elements and secondary root-cause elements, and wherein at least one primary root-cause element is visually linked with at least one secondary root-cause element to demonstrate the at least one primary root-cause element being a cause of the at least one secondary root-cause element. Moreover, in certain embodiments, the GUI includes the display components in a hierarchical arrangement, wherein display components corresponding to individual components are displayed within one of a common source parent boundary or a common sink parent boundary, and wherein the GUI displays the common source parent boundary and the common sink parent boundary within a common parent boundary. In certain embodiments, determining power characteristic data for the IC DUT includes generating a tabular power characteristic reference table for each violation cluster; and overlaying a plurality of interactive elements over the GUI includes generating the at least one interactive link element based at least in part on the tabular power characteristic reference table for each cluster.

Certain embodiments are directed to a non-transitory computer-readable storage medium including executable instructions configured to, when executed by a processor, cause the processor to: receive design data for an integrated circuit (IC) design; determine, based at least in part on the design data, power characteristic data for the IC design, wherein the power characteristic data identifies a power intent hierarchy for the IC design and violations present within the IC design; generate within a graphical user interface (GUI), display components corresponding to individual components encompassed within the power intent hierarchy; generate, within the GUI and based at least in part on the design data, one or more graphical links between displayed components; generate, based at least in part on the power characteristic data for the IC design, one or more violation clusters each including a plurality of design violations for the IC design, wherein design violations within each of the one or more violation clusters are characterized as having at least one shared root cause; associate the one or more violation clusters with the one or more graphical links; overlay a plurality of interactive elements over the GUI, wherein the plurality of interactive elements include: at least one interactive link element providing data indicative of the one or more violation clusters in association with corresponding ones of the one or more graphical links; at least one root-cause element corresponding to the at least one shared root cause; and a graphical association between the at least one interactive link element and the at least one root-cause element to indicate a relationship between the at least one root-cause element and the at least one interactive link element.

In various embodiments, the at least one interactive link element has associated detail data indicative of individual violations within a violation cluster, and further including executable instructions configured to: upon receipt of input indicating interaction with a first interactive element, display a detail element within the GUI including at least a portion of the detail data. In certain embodiments, the detail data includes a plurality of interactive links associated with individual violations within the violation cluster, and further including executable instructions configured to: upon receipt of input indicating interaction with an interactive link associated with a first individual violation, display a detail-view GUI providing a violation-specific schematic associated with the first individual violation. Moreover, the display components may include source components and sink components; and each of the one or more graphical links may directly link at least one source component with at least one sink component. In certain embodiments, the at least one root-cause element includes primary root-cause elements and secondary root-cause elements, and wherein at least one primary root-cause element is visually linked with at least one secondary root-cause element to demonstrate the at least one primary root-cause element being a cause of the at least one secondary root-cause element. In various embodiments, the GUI includes the display components in a hierarchical arrangement, wherein display components corresponding to individual components are displayed within one of a common source parent boundary or a common sink parent boundary, and wherein the GUI displays the common source parent boundary and the common sink parent boundary within a common parent boundary. In certain embodiments, determining power characteristic data for the IC DUT includes generating a tabular power characteristic reference table for each violation cluster; and overlaying a plurality of interactive elements over the GUI includes generating the at least one interactive link element based at least in part on the tabular power characteristic reference table for each cluster.

BRIEF DESCRIPTION OF THE SEVERAL VIEWS OF THE DRAWINGS

Reference will now be made to the accompanying drawings, which are not necessarily drawn to scale, and wherein:

FIG. 8 illustrates example power characteristics generated for an IC DUT in accordance with certain embodiments;

FIG. 9 illustrates example violation-specific data table entries in accordance with certain embodiments;

DETAILED DESCRIPTION

Figure 1:
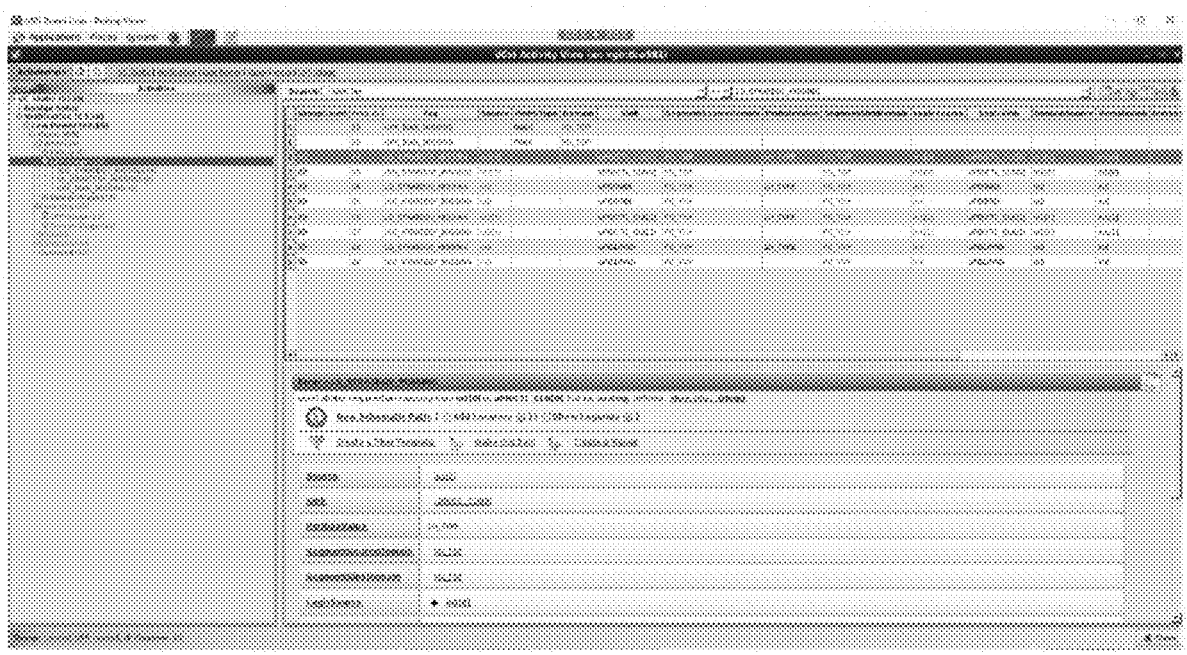
FIG. 1 illustrates an example GUI listing individual design violations, in accordance with an embodiment.
Figure 2:
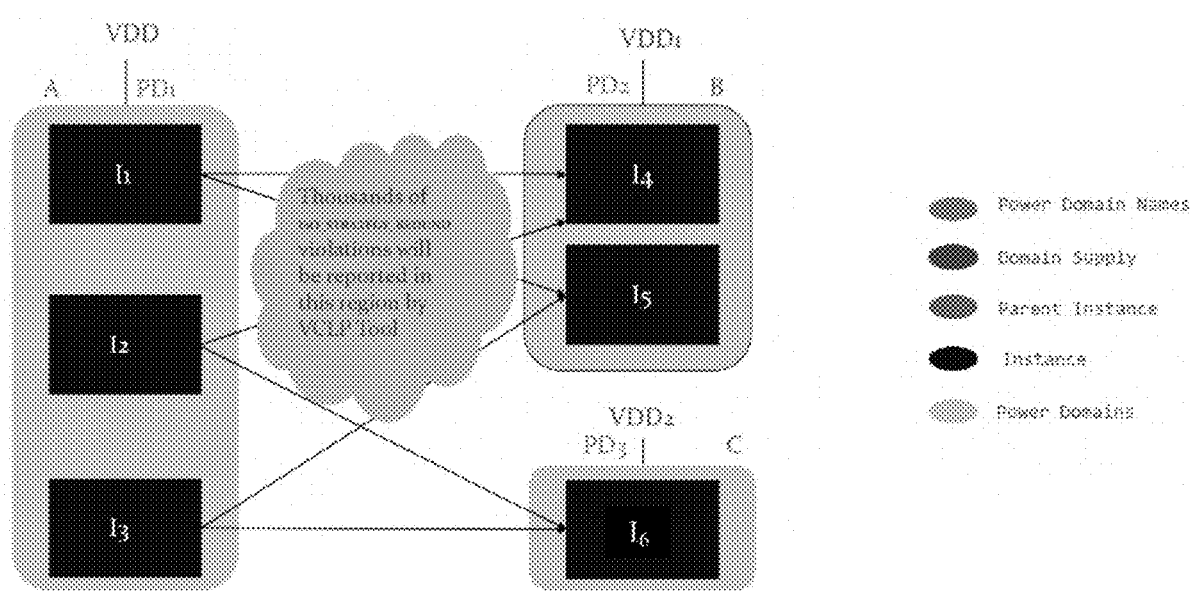
FIG. 2 illustrates an example schematic GUI, in accordance with an embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

For a particular IC design, a static IC design tool may generate a large number of violations, which may cause difficulties for a user to debug and find root-causes attributable to those violations. Moreover, currently available GUI-based debug tools are configured for only displaying one violation schematic at a time. Accordingly, a need exists for tools configured to efficiently group related IC design violations/errors and identify root cause(s) for the errors of each group.

Various embodiments are directed to an IC design tool configured for generating a power architecture GUI schematic enabling a user to visualize a cluster of related violations and their corresponding root causes by automatically generating the power architecture GUI to include only high-level summary representations of various components within an IC DUT, and to overlay visual indicators corresponding with the cluster of related violations on a high-level power hierarchy GUI display. IC design tools according to certain embodiments as discussed herein address limitations of GUIs of existing IC design tools and provide functionality enhancing the user debugging experience. For each violation group, the IC design tool of various embodiments automatically determines a power intent hierarchy and represents the power intent hierarchy via block diagrams provided via a GUI. The block diagrams include display components corresponding to individual components within the power intent hierarchy, such as representing source components and sink components of the power intent hierarchy. An associated design hierarchy with relevant design errors/violations in the group are properly annotated on the power intent block diagram. Color schematics may be provided in certain embodiments to link root cause violation(s) with its effect violations. The generated GUI may integrate with detail view GUIs to enable users to easily navigate between the power architecture schematic view and the detailed view. A user can access individual violation information from the links provided in this power architecture schematic view.

The power architecture schematic view generated in accordance with various embodiments extracts high-level structural information from correlated violation groups and overlays it on the power architectures of the DUT. The high level structural information may be included within the power architecture GUI as a plurality of interactive elements overlaid onto the power architecture GUI, including interactive link elements providing data indicative of one or more violation clusters within the IC DUT, root-cause elements corresponding to each of a plurality of automatically-identified root-causes, and/or graphical associations (e.g., lines or other visual links) between the root-cause elements and violation clusters to establish a visual connection between violation groups and their corresponding determined root-causes.

The present power architecture schematic view enables users to accelerate root cause analysis and identify an optimal solution of a correlated group of violations, for example, by visually displaying a correlation between violations, for example, visual proximity, and similarity in display attributes (e.g., color, size). Moreover, various embodiments are configured to identify root cause(s) of one or more violations (e.g., groups of violations) by visually identifying the root causes on the displayed design schematic.

Detail View

In certain embodiments, the present IC design tool is configured to generate one or more detail schematic views to provide detailed data regarding individual design violations. FIG. 1 illustrates an example GUI listing individual design violations, in accordance with an embodiment. The GUI may be used to access violation-specific GUI displays. As illustrated in FIG. 1, the displayed GUI visually associates violation information to design information (e.g. power domain, supply, gates, and/or the like) which the user can access by clicking the link provided. This visualization helps users to devise a fix for a design problem associated with the violation. In certain embodiments, such a display may be provided for specific focus on a single design violation, and in certain embodiments, the IC design tool may be configured for providing such a display in response to user input requesting access to a schematic associated with specific design violation.

FIGS. 2-5 illustrate an example process of debugging an IC DUT utilizing a detailed view alone. In the example scenario of FIGS. 2-5, a switching power domain PD1 is driving both power domains PD2 and PD3. The voltage supplies (VDD, VDD1, and VDD2.) of the respective power domains at different states (S1, S2, S3, S4, and S5) are specified in the power state tables (pst1, pst2) of FIG. 3. As per power state table pst1, there exists OFF-to-ON conditions between power domain pair PD1 and PD2 (state S1) and power domain pair PD1 and PD3 (state S3). This means that both power domain PD2 and PD3 may require protection from power domain PD1. To protect the power domains, a user may add an isolation policy on the boundary of the power domain PD1 via a function such as:

set_isolation-domain $PD1$

Conventionally, a user follows a modular design approach, where multiple components of the design are developed in parallel and then integrated together to produce the full design. Hence for a single design it is possible to have multiple power state tables (PST) across multiple power scopes. A portion of an IC design tool merges all the power state tables of the design and creates a single consolidated PST, also referred to as a final PST. All the conflicting states between different PSTs are excluded from the final PST. Thus, PST merging can alter the supply relationships between different power domains.

Figure 3:
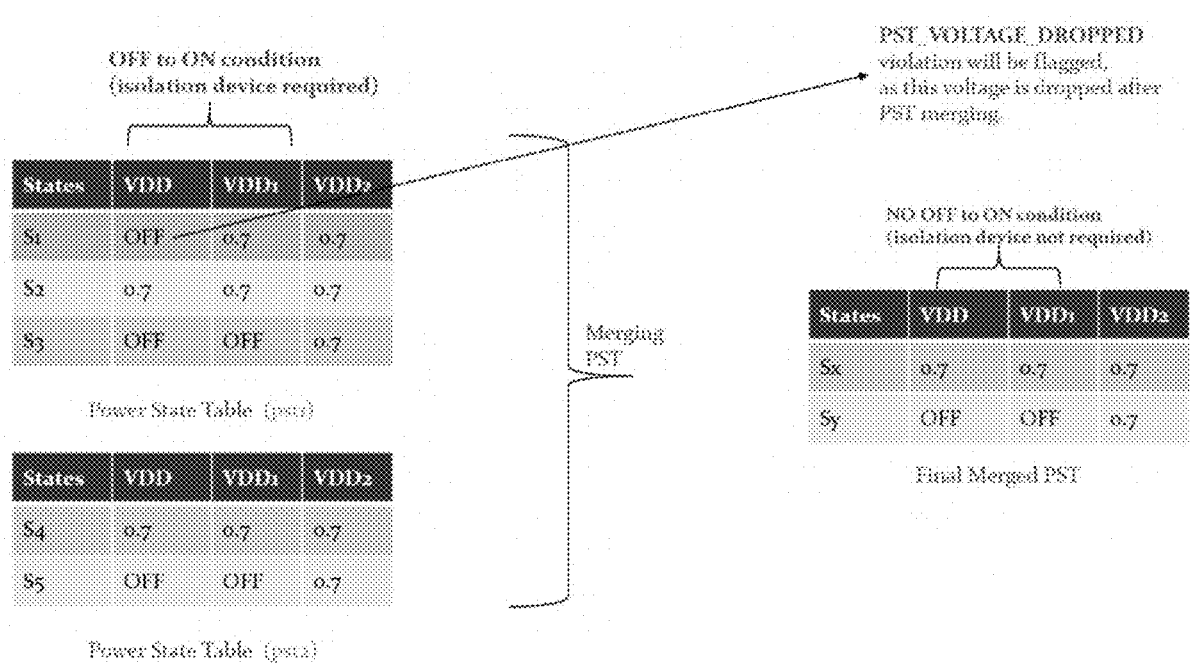
FIG. 3 illustrates example power state tables, in accordance with an embodiment.

In the above design, the user may fail consider a second PST which also defines a set of relationships between the voltage supplies. Referring to FIG. 3, during PST merging, S1 is the conflicting state between PSTs pst1 and pst2 and is dropped from the final PST. While dropping a conflicting power state, a power verification tool may flag a violation called PST_VOLTAGE_DROPPED having information such as:
Tag: PST_VOLTAGE_DROPPED
UPFSupply: VDD
VoltageValue: 0.7
MissingVoltageValue: OFF In the final PST, there is no OFF-to-ON condition between power domain pair PD1 and PD2 (between VDD and VDD1 in FIG. 3) but there is an OFF-to-ON condition between PD1 and PD3 (between VDD1 and VDD2 in FIG. 3). So, for each path between power domain pair PD1 and PD2 (for medium and large designs this path count can be in thousands) the power verification tool flags a ISO_STRATEGY_REDUND violation (a low power violation reflecting that there is an isolation strategy specified as a Unified Power Format (UPF) command for insertion of isolation cells at defined locations within an IC design to provide additional protection against short-circuits and/or other electrical-related problems within an IC design between a logic source and logic sink but the strategy is not required). One such ISO_STRATEGY_REDUND violation may include the following:
Tag: ISO_STRATEGY_REDUND
LogicSource: A/I1
LogicSink: B/I4
SourceDomain: PD1
SinkDomain: PD2
SourceSupply: VDD
SinkSupply: VDD1

Figure 4:
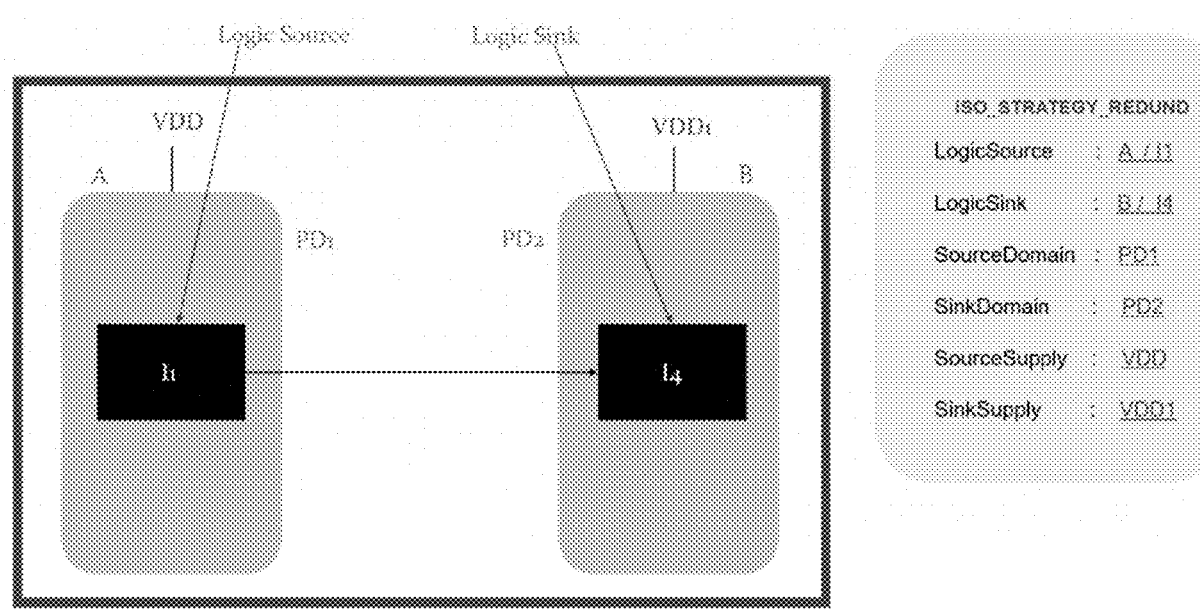
FIG. 4 illustrates an example schematic GUI without annotation, in accordance with an embodiment.

A corresponding GUI schematic may be as shown in FIG. 4. The schematic shown in FIG. 4 only conveys the partial information that an isolation strategy has been specified between source A/I1 and sink B/I4, which is not required. A user fixing the above violation using this schematic view will locally fix this problem by excluding the instance A/I1 from the above policy as follows:

set_isolation-domain $PD1$-exclude_elements{$A/I1$},

The user may be unaware of the fact that some other violation(s) might be related to this one through a common root cause.

Similarly, for fixing other ISO_STRATEGY_REDUND violations on power domain PD1 the user may continue updating the existing strategy such as through functions of:

set_isolation-domain $PD1$-exclude_elements{$A/I1,A/I2$} set_isolation-domain $PD1$-exclude_elements{$A/I1$ $A/I2$ $A/I3$}

The user may continue introducing analogous functions to fix additional similar design violations until all the violations are fixed. This approach is both time consuming and may lead to non-optimal solution(s). The optimized solution for this problem is to add a state to the power state table pst2 as follows, add_pst_state $S6$-pst pst2{OFF 0.7 0.7}.

Adding the power state table remedies the PST_VOLTAGE_DROPPED violation (issued on voltage VDD, state S1) along with all the ISO_STRATEGY_REDUND violations given on power domain PD1. In this case, the PST_VOLTAGE_DROPPED violation is the root cause for all the ISO_STRATEGY_REDUND violations that arose from power domain PD1. Thus, providing the new power state table resolves all the related ISO_STRATEGY_REDUND violations. Alternatively saying, an ideal debug approach would be to start the debug process from PST_VOLTAGE_DROPPED violation. However, debugging the DUT utilizing only a single detail view does not provide a user with information regarding how design problems relate to one another, and accordingly a user may not quickly identify a common root cause(s) and their structural connectivity in the DUT.

By grouping related low-power violations and identifying root causes for each group, the present IC design tool may generate a consolidated, power architecture schematic view of a design schematic identifying related violations (and their shared root cause violations) at a time and overlay them on design schematic, highlighting their area of impact in the DUT. For the above scenario, the power architecture schematic view provides a consolidated view for all the ISO_STRATEGY_REDUND violations on power domain PD1, as shown in FIG. 5.

The generated power architecture schematic view highlights issues in user power intent by abstracting out minute design properties (such as individual signal level connections, non-impactful gates on the path, etc.) and generates a partial design schematic through a block diagram providing a summary of data relating to a design.

Figure 5:
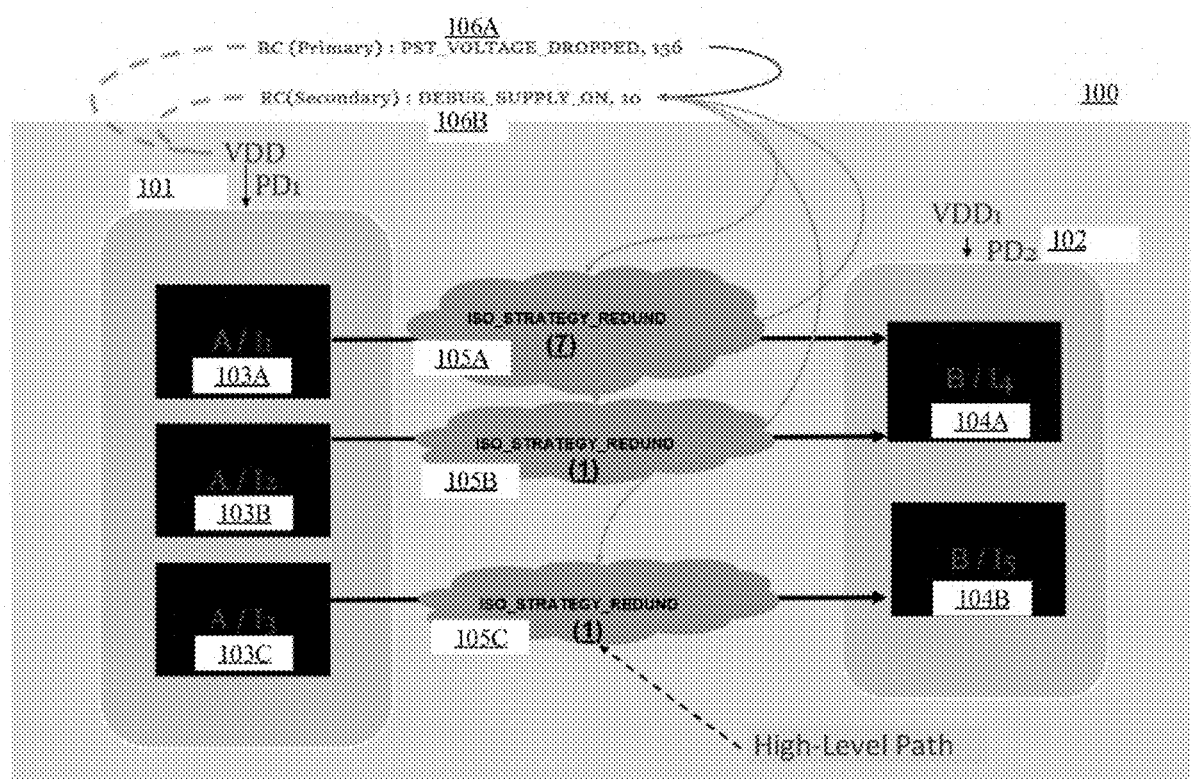
FIG. 5 illustrates an example power architecture schematic view, in accordance with an embodiment.

In the example schematic of FIG. 5, users are presented with a block level diagram of a partial design schematic within which all the related violations (along with root cause violations) are confined. The power architecture schematic view identifies:

A common source-sink parent 100 as a boundary that contains all the violations of a cluster.

A common source parent instance 101 as a bounded region contained within the common source-sink parent and contains all of the source instances of the violations in the cluster.

A common sink parent instance 102 as a bounded region contained within the common source-sink parent and contains all of the sink instances of the violations in the cluster.

Source instances 103A, 103B, 103C (A/I1, A/I2, A/I3) represent each possible logic source instance of the violations.

Sink instances 104A, 104B (B/I4, B/I5) represent each possible logic sink instances of the violations.

High-level paths 105A, 105B, 105C (A/I1-B/I4, A/I2-B/I4, A/I3-B/I5) represent complicated signal level connections (e.g., including a source instance, intermediate instance, sink instance tuple) by replacing the complicated path with a representative path. This automated display simplification helps user to visually perceive design issue(s) more easily without the need for a detailed understanding of the complex interconnections between source, intermediate, and sink instances.

Once the IC design tool generates the block level diagram, the design tool adds appropriate debug information (including information regarding violations associated with specific paths, as reflected within the interface elements shown as a part of the high-level paths 105A-105C) as well as debug information relating to specific root causes, as indicated at 106A-106B, at appropriate locations of the diagram to generate a display providing a high-level overview of potential design violations within the complex IC design. For example, effect violations (typically low level violations) may be annotated on proper high-level paths 105A-105C to enable a user to localize design problems. The IC design tool may additionally annotate root cause violations (usually, high level violations having a reaching impact across multiple portions of an IC DUT) 106A-106B with locators (e.g., visual lines or other visual linking components) for identifying the areas impacted by the root cause violations. Power domain and supply information may additionally be annotated on each instance. Moreover, the IC design tool may color functionally similar blocks with similar colors for faster identification of included similarities.

Figure 6:
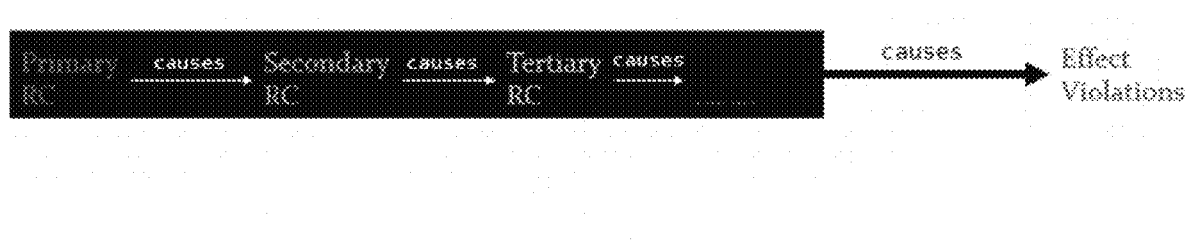
FIG. 6 illustrates a relationship between root-causes and effect violations in accordance with an example embodiment.

The generated power architecture schematic view provides clustered information regarding violations, such that a group of related design violations may be visually grouped within the power architecture schematic view. The IC design tool may additionally define an order (e.g., distinguishing between primary and secondary root causes) between root cause violations. The relationships between root cause and effect violations can be depicted as shown in FIG. 6.

In many instances, correctly identifying and fixing a primary root cause (RC) results in fixes to non-primary root causes (e.g., secondary root causes) and effect violations. Accordingly, utilizing the power architecture schematic view, users are provided with information helpful for debugging ISO_STRATEGY_REDUND violations. With reference to the example discussed in reference to FIGS. 2-5, all of the ISO_STRATEGY_REDUND violations between power domain PD1 and PD2 are related by a common root cause, as visible through user interface elements provided within the generated display of the schematic of FIG. 5. Such information display may provide the user with a visible indication that all of the grouped violations are fixable together, such that individual local fixes for each individual violation are not required. Second, the generated schematic view additionally demonstrates that the grouped violations are caused at least partially by the secondary root cause violation DEBUG_SUPPLY_ON. The display element corresponding with this secondary root cause violation visually points to all the instances for which the supply voltage is ALWAYS ON, which are A/I1, A/I2 and A/I3. These instances are acting as the logic sources for all the paths on which the redundant violations are raised. Since the logic source of these paths are ALWAYS ON, any protection strategy applied on these paths will be redundant. Finally, the generated power architecture schematic view illustrates the primary root cause violation PST_VOLTAGE_DROPPED violation identified as responsible for all these violations. The visual annotation of this violation indicates that a voltage value (here OFF) has been dropped for supply (here VDD) which may cause some design issues at lower level. In the above view, PST_VOLTAGE_DROPPED is pointing to every instance for which the supply is VDD.

Now, to fix all the violations in this group the users need to add a power state as follows, add_pst_state *S*6-pst pst2{OFF 0.7 0.7}.

Power Architecture Schematic View

The power architecture schematic view generated by the present IC design tool consolidates all of the grouped (by root cause) violations into a single view along with their root cause violation(s). Information indicative of the grouping is then visually overlaid on the power scopes of the power architecture schematic view of the DUT to highlight fault(s) in power intent. Moreover, complex interactions between instances are displayed at a high level (omitting detailed interim interactions/connections between intermediate instances), emphasizing source and sink instances within a connection, thereby enabling a user to identify high-level design issues with minimal effort. Moreover, the power architecture schematic view provides power-related information annotations at optimal locations within the generated display, such as illustrating power domain and supply voltage information annotated on respective displayed links, components, and/or the like within the generated power architecture GUI, annotating root cause violations on relevant segments within locators, and annotating effect violations on their respective path representations. Moreover, as indicated above, the power architecture schematic view of certain embodiments is generated for interaction with detail-level views, thereby enabling a user to easily switch between the power architecture schematic view and detail level schematic views during a debugging process.

Construction of the Power Architecture Schematic View

Figure 7:
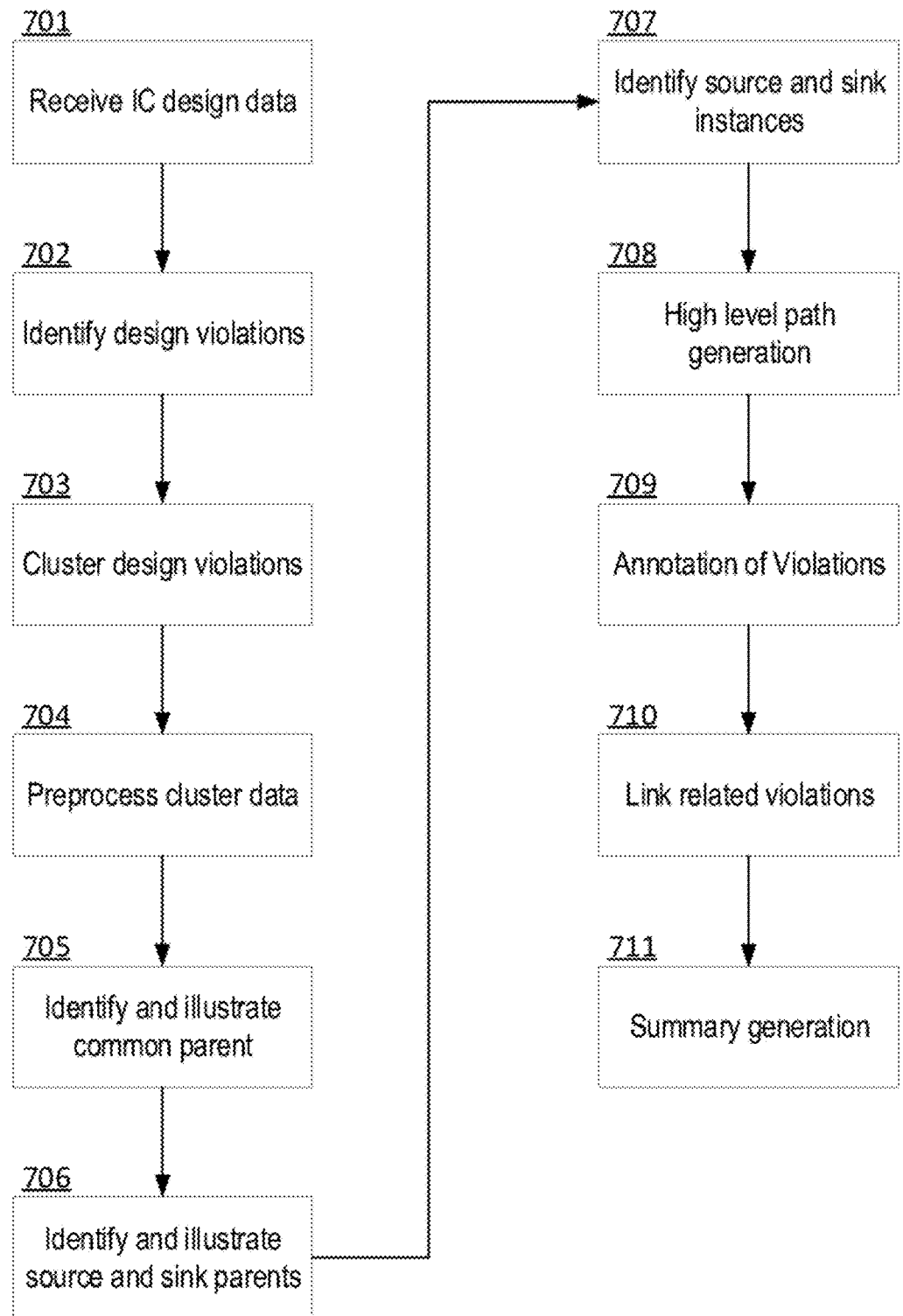
FIG. 7 illustrates an example flowchart for generating a power architecture view in accordance with certain embodiments.

FIG. 7 illustrates an example flowchart of a process for generating a power architecture schematic view, according to certain embodiments. As indicated at 701, the IC design tool receives IC design data indicative of an IC DUT to be debugged. The IC design data may be generated through a separate IC design tool configured to enable a user to generate an IC DUT, or the IC design data may be generated (e.g., based at least in part on user input or other input) by a portion of the IC design tool discussed herein. In certain embodiments, the IC design data may include data identifying various IC components (as well as their respective characteristics), connections between various of those IC components, power state tables associated with the IC DUT, and/or the like.

As indicated at 702, the IC design tool identifies design violations within the IC design data, indicating one or more errors associated with the IC DUT reflected by the IC design data. The IC design tool may utilize one or more methodologies for identifying design violations, such as executing one or more simulations based at least in part on provided power state tables to determine whether one or more states results in generation of an error upon execution based at least in part on the IC design data (examples are discussed in now-issued U.S. Pat. No. 10,586,001, the contents of which are incorporated herein by reference in their entirety). The IC design tool stores error data indicative of the generated design violations.

Figure 8:
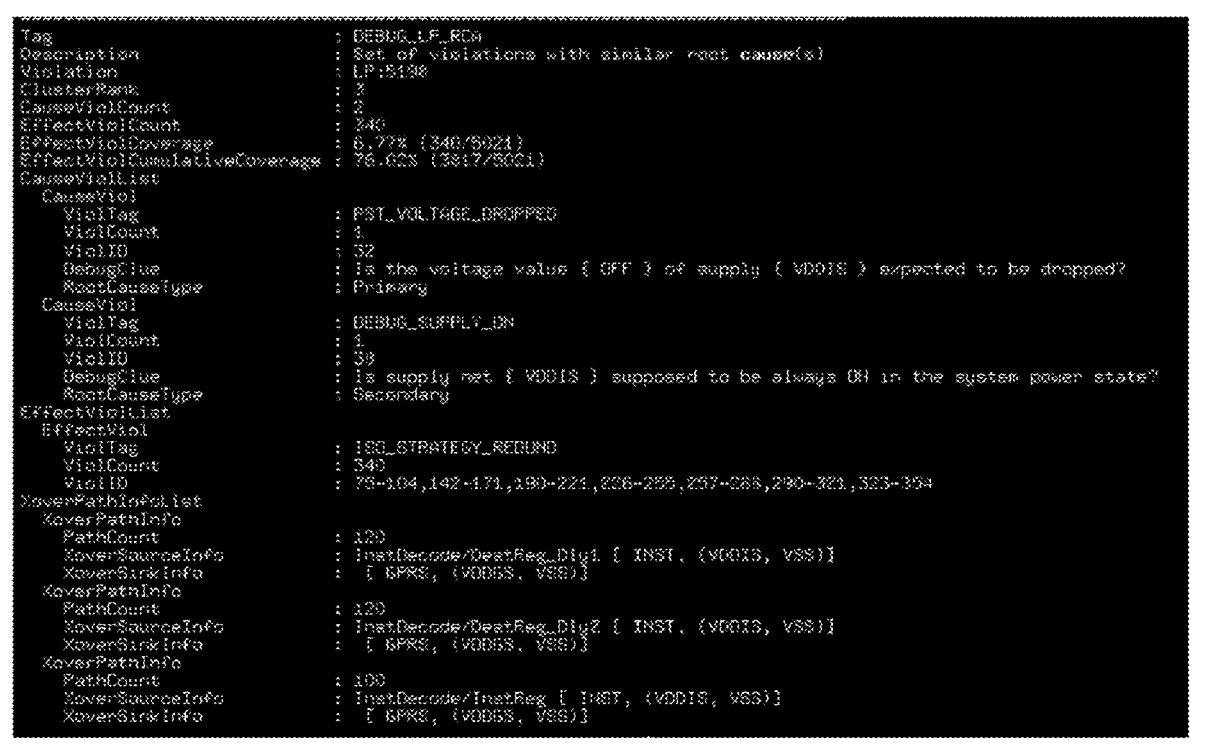

The IC design tool generates power characteristic data for the IC DUT, wherein the power characteristic data includes data indicative of violation clusters reflected within the design data. Those violation clusters reflect an association between related violations, for example, based at least in part on a determined common root cause for the violations within a respective cluster, as indicated at 703. To cluster related violations together, the IC design tool generates the power characteristic data indicative of the generated clusters, as reflected within FIG. 8.

The power characteristic data generated for each cluster includes data indicative of: a root cause and effect violation count identified as associated with the cluster, a percentage of the total violations for the IC DUT encompassed by the individual cluster, root cause violation information along with data indicative of root cause type (e.g., primary, secondary, and/or the like) for each violation reflected within the cluster, effect violation information, information indicative of crossover path with unique characteristics and number of violations on each path.

With reference again to FIG. 7, the IC design tool utilizes the generated data indicative of the clustered design violations to begin generation of the power architecture schematic view. The IC design tool pre-processes data within the clustered design violation data as reflected at 704 to generate additional data for each violation, such as identifying: (a) a source instance associated with the design violation; (b) a sink instance associated with the design violation; (c) a source supply associated with the design violation; (d) a sink supply associated with the design violation; (e) a source power domain associated with the design violation; (f) a sink power domain associated with the design violation; and (g) other power-related information for root cause violations (e.g., a power supply state). The generated data for each design violation may additionally include a unique identifier associated with a violation cluster, thereby enabling association between violations within a shared cluster.

Figure 9:
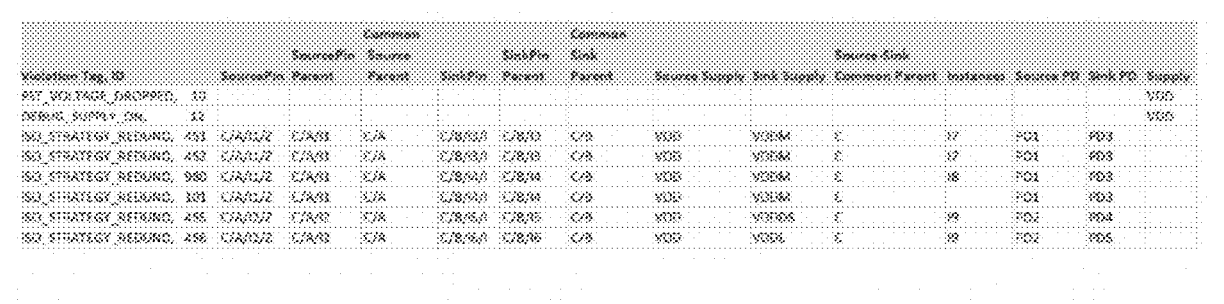

The IC design tool preprocesses the IC design tool to generate the above information based at least in part on data stored within a cluster database and low power violation database and provides appropriate data for each violation within a tabular/delimited data output (e.g., a .csv file), such as that shown in FIG. 9. The IC design tool generates a data table for each violation cluster, and the generated data tables are utilized for constructing the power architecture schematic view.

With reference again to FIG. 7, the IC design tool utilizes the data stored within each violation cluster-specific data table to identify a common parent for all violation clusters to be illustrated within the power architecture schematic view. This information may be retrieved from a corresponding column of the cluster-specific data table (e.g., as shown in FIG. 9), which may include a unique parent identifier indicating a parent to be associated with the violation cluster.

Figure 10:
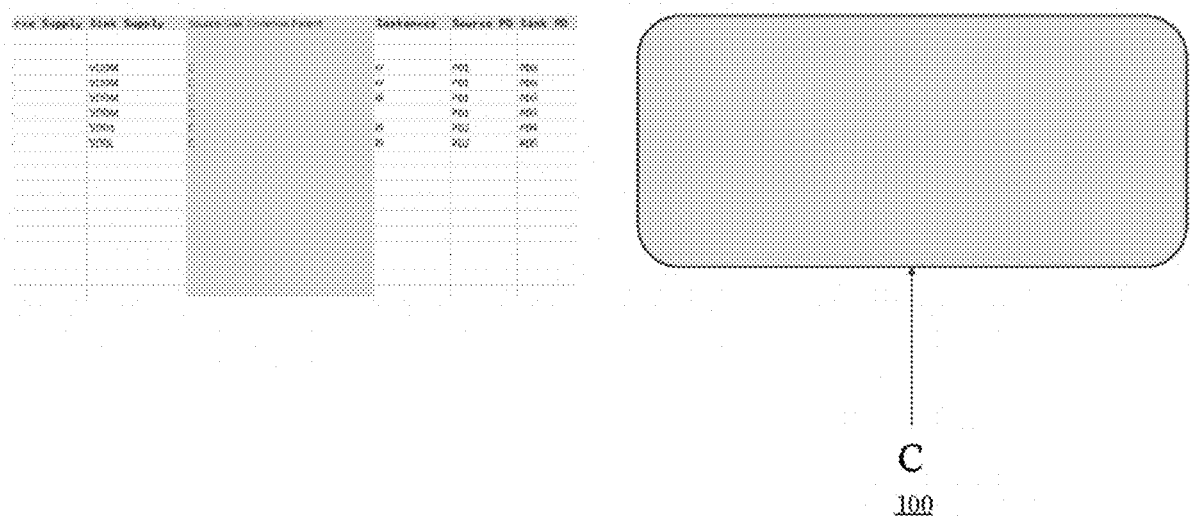
FIG. 10 illustrates the generation of a common parent for inclusion within a power architecture schematic view in accordance with certain embodiments.

The common parent may be represented visually within the power architecture schematic view as a boundary 100 within which all other elements of the power architecture schematic view are to be contained and visually assists a user in narrowing an area of focus for debugging processes. The resulting identified components of the power architecture schematic view are illustrated in FIG. 10, which illustrates the common parent boundary 100 (C). Moreover, in certain embodiments the resulting generated boundary corresponding with the common parent is filled with a corresponding color that may be distinguishable from other colored boundaries discussed in greater detail herein.

Figure 11:
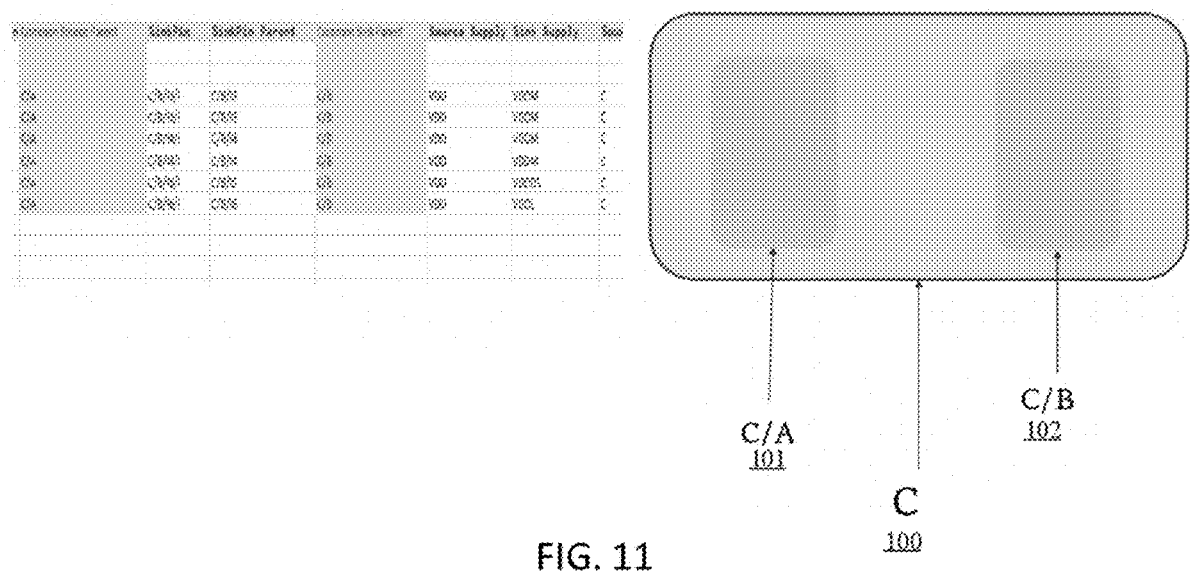
FIG. 11 illustrates the placement of common source parent and common sink parent display elements in accordance with certain embodiments.

At 706 of FIG. 7, the IC design tool identifies a common source parent and a common sink parent for those design violations to be illustrated in the power architecture schematic view. The common source parent and the common sink parent may be graphically illustrated as filled bounded areas 101 and 102, respectively, (each having a distinct fill color, or each having a shared fill color that is distinguishable from the fill color of the above-noted graphical representation of the common source parent 100) that are overlaid within the bounded area of the common parent 100 discussed above. Data indicative of the common source parent and the common sink parent are identified within corresponding columns of data tables generated for each violation cluster. An example illustrating the common source parent and common sink parent is illustrated in FIG. 11, with the common source parent illustrated at 101 (Block C/A), and the common sink parent illustrated at 102 (Block C/B) (each of which being illustrated within the boundary of common parent 100.

Figure 12:
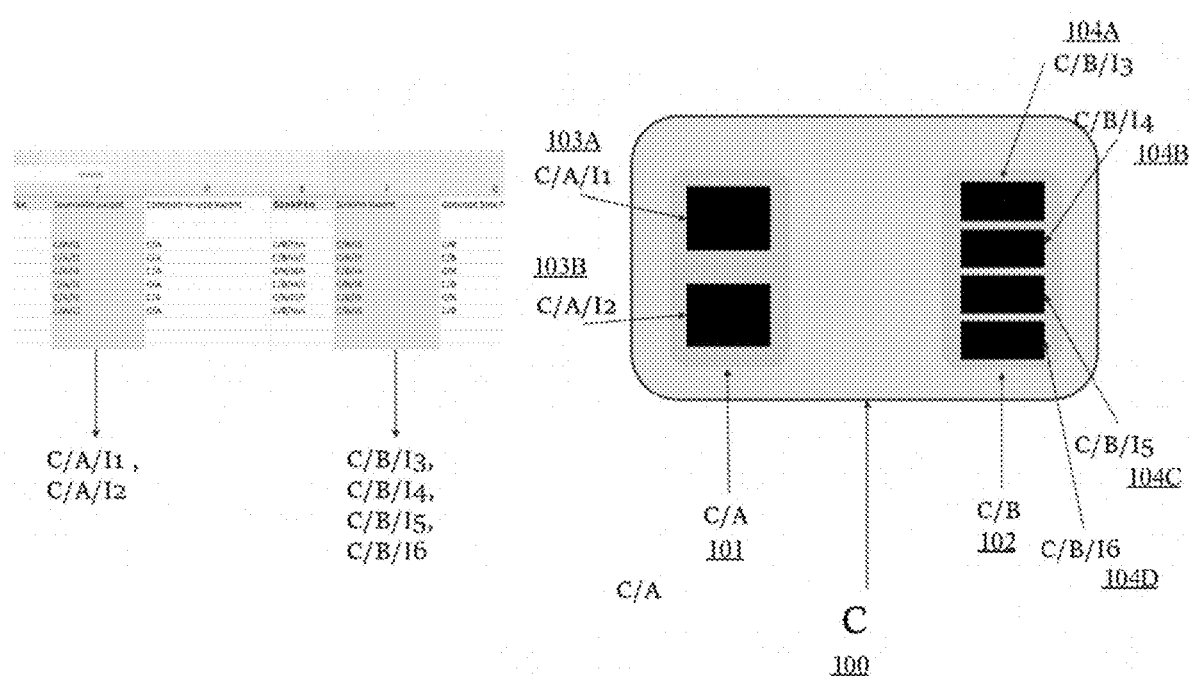
FIG. 12 illustrates placement of individual display elements within a power architecture schematic view in accordance with certain embodiments.

At 707 of FIG. 7 indicates that all source instances and sink instances reflected within the violation cluster data tables are identified and illustrated within the power architecture schematic view (e.g., within bounded areas of the common source parent and common sink parent, respectively). FIG. 12 illustrates the resulting example power architecture schematic view with source instances C/A/I$_1$ and C/A/I$_2$ illustrated as blocks 103A and 103B within the common source parent bounded area 101 (C/A), and sink instances C/B/I$_3$, C/B/I$_4$, C/B/I$_5$, and C/B/I$_6$ illustrated as blocks 104A, 104B, 104C, and 104D within the common sink parent bounded area 102 (C/B).

Figure 13:
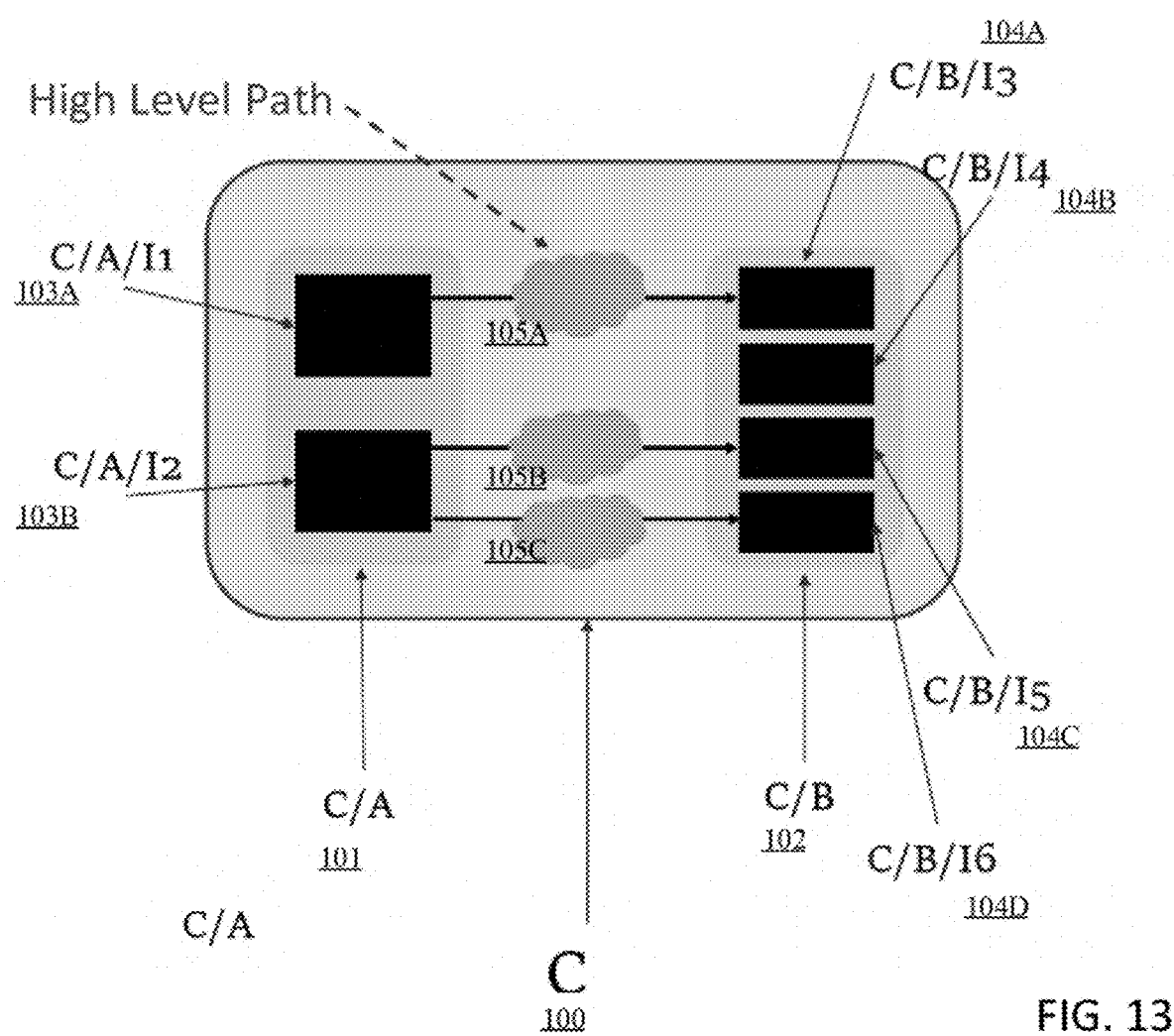
FIG. 13 illustrates generation of links between individual display elements and overlaid interactive elements in accordance with certain embodiments.

The IC design tool then generates high level path representations between source and sink instances. Those high level path representations may be embodied as simplified representations 105A, 105B, and 105C reflecting actual paths between source and sink instances that omit complex interim connections between the source and sink instances. The high level path representations 105A, 105B, and 105C retain data indicative of relevant connections from a set of all connections of the actual path to enable generation of simplified representations of the actual paths. Moreover, the high level paths are visual representations 105A, 105B, and 105C of data contained within the violation cluster-specific data files indicating connections between specific individual components of the power architecture schematic view. To generate the high level paths, the IC design tool first identifies a candidate path reflected within a data table corresponding with a particular violation cluster. The candidate path is identified as having at least one violation within the cluster assigned to the path. The high level representations 105A, 105B, and 105C of each of the paths is illustrated by connecting the source instance (103A or 103B in the representation of FIG. 13) with the sink instance (04A, 104B, 104C, or 104D in the representation of FIG. 14) as identified for the path. An interactive element, such as a symbol (e.g., a cloud as illustrated in FIG. 13) is overlaid onto each path reflected to form a portion of the high level representation of a path within the power architecture schematic view and data indicative of the generated high level path is reflected within the interactive element (e.g., with human-readable text). For example, the data contained within the interactive element may be indicative of a list of violations corresponding with the path, a grouping criteria utilized for clustering violations corresponding with the illustrated high level path, and/or the like.

The generated power architecture schematic view is annotated as indicated at 709 to reflect data corresponding with specific aspects of the violations reflected within the data tables. The information that may be included within annotations added to the power architecture schematic view includes power domain and supply information annotations for various instances. Moreover, root cause and effect violations are annotated on appropriate segments of generated paths. The information displayed may additionally be illustrative of relationships between each displayed component within the power architecture schematic view via color coding to visually identify related/similar components.

Figure 14:
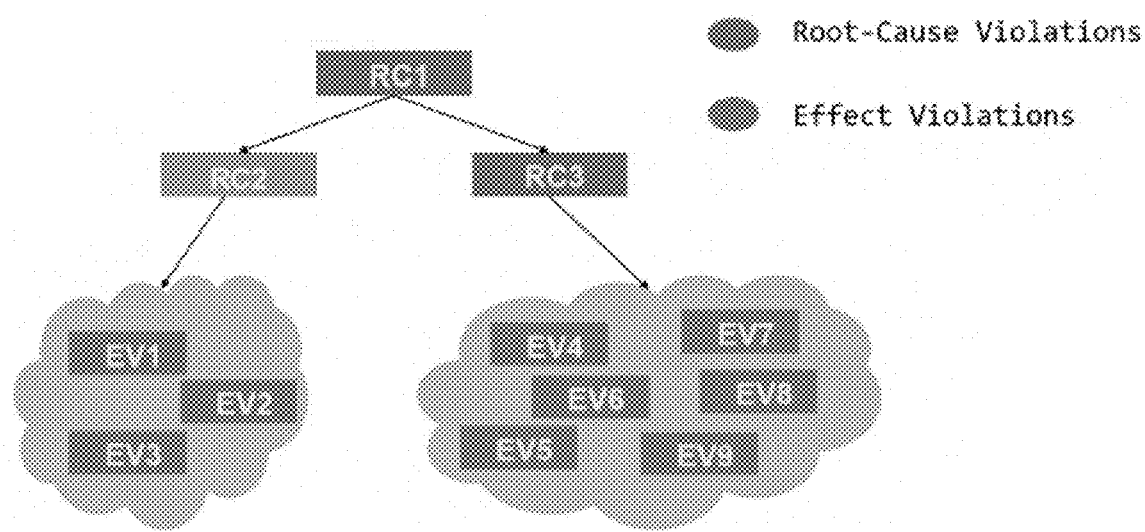
FIG. 14 illustrates a relationship between root-causes and effect violations in accordance with certain embodiments.

Once annotations have been added to the power architecture schematic view, the IC design tool links related violations. In a static verification domain, the root cause and effect violation relationship may be hierarchical, meaning a root-cause may be a primary root cause (e.g., no other root-causes are identified as the cause of a primary root cause) or a secondary root cause (e.g., another root cause, such as a primary root cause, is the cause of a secondary root cause). Moreover, each root cause may be the root cause of one or more effect violations, as demonstrated within the visualization of FIG. 14. In the illustration of FIG. 14, RC1 is identified as the primary root cause responsible for secondary root causes RC2 and RC3. RC2 is the root cause for effect violations EV1-EV3, and RC3 is the root cause for effect violations EV4-EV9.

Figure 15:
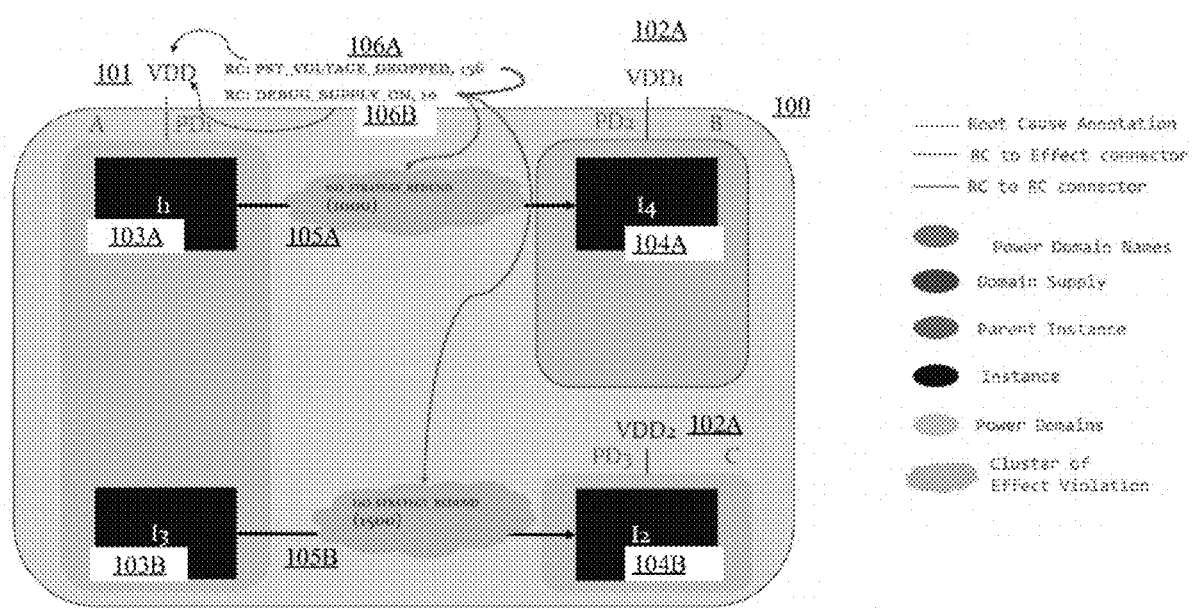
FIG. 15 illustrates a power architecture schematic view generated in accordance with certain embodiments.
Figure 16:
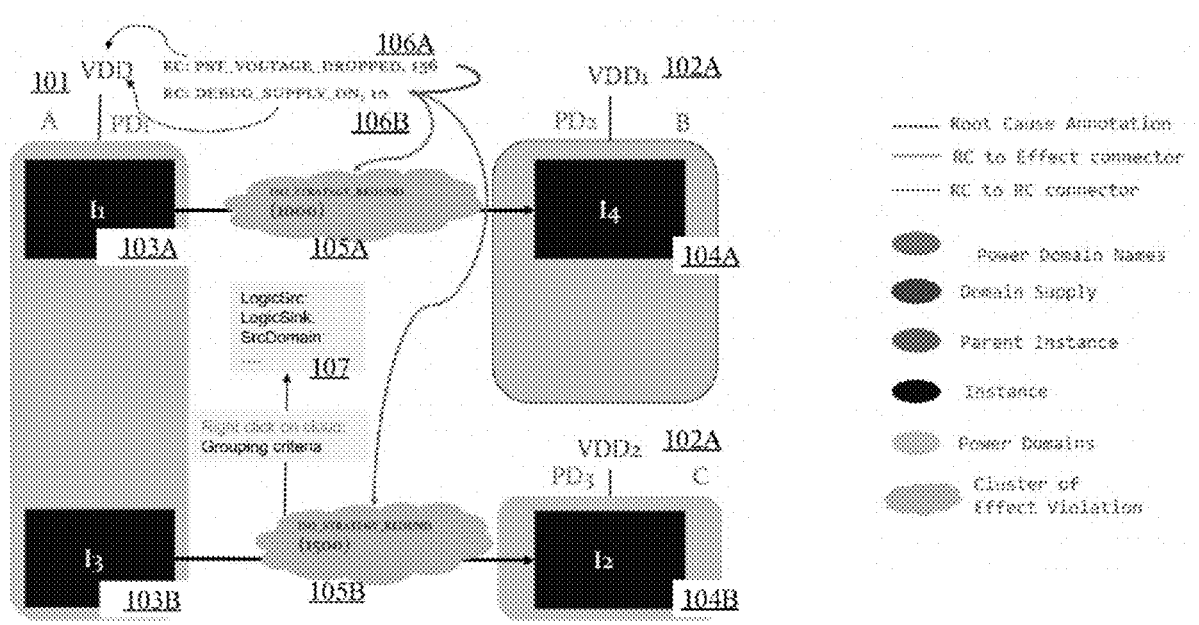
FIG. 16 illustrates additional detail data accessible via interaction with an interactive element included within a power architecture schematic view.

Incorporating the annotations into the generated power architecture schematic view provides root-cause information for the display, as indicated at 106A and 106B in FIG. 15. Moreover, as indicated at 711 of FIG. 7, the IC design tool generates a high-level summary for accompanying the power architecture schematic view. Portions of the generated high-level summary may be reflected within the generated power architecture schematic view, while other summary data may be accessed through user-interactive portions of the power architecture schematic view. For example, the above-mentioned interactive elements (e.g., symbols) overlaid as a part of the high-level paths are provided as a high-level summary of a cluster of related violations. Moreover, the displayed interactive elements are interactive user interface elements in certain embodiments, and clicking on the interactive elements causes the IC design tool to provide additional detailed data regarding the violations encompassed by the illustrated cluster within the power architecture schematic view, as demonstrated at 107 in FIG. 16 (clicking on the interactive element between $I_3$ and $I_2$ causes the IC design tool to provide additional data within pop-up data windows 107 overlaid on the illustrated display).

Figure 17:
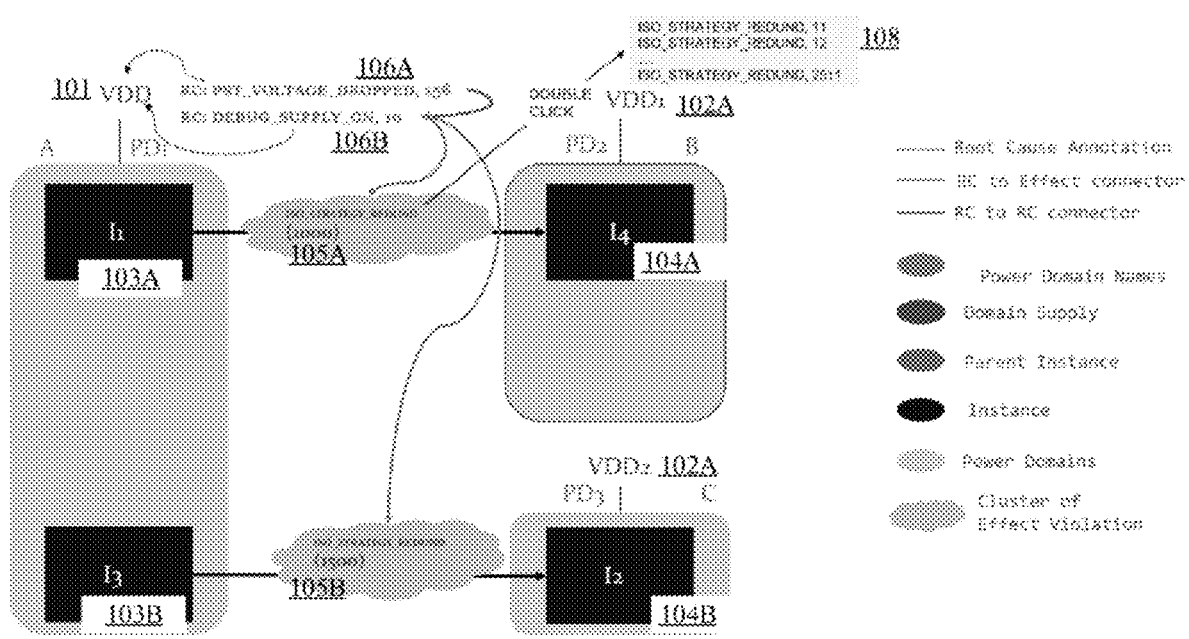
FIG. 17 illustrates additional detail data accessible via interaction with an interactive element included within a power architecture schematic view.
Figure 18:
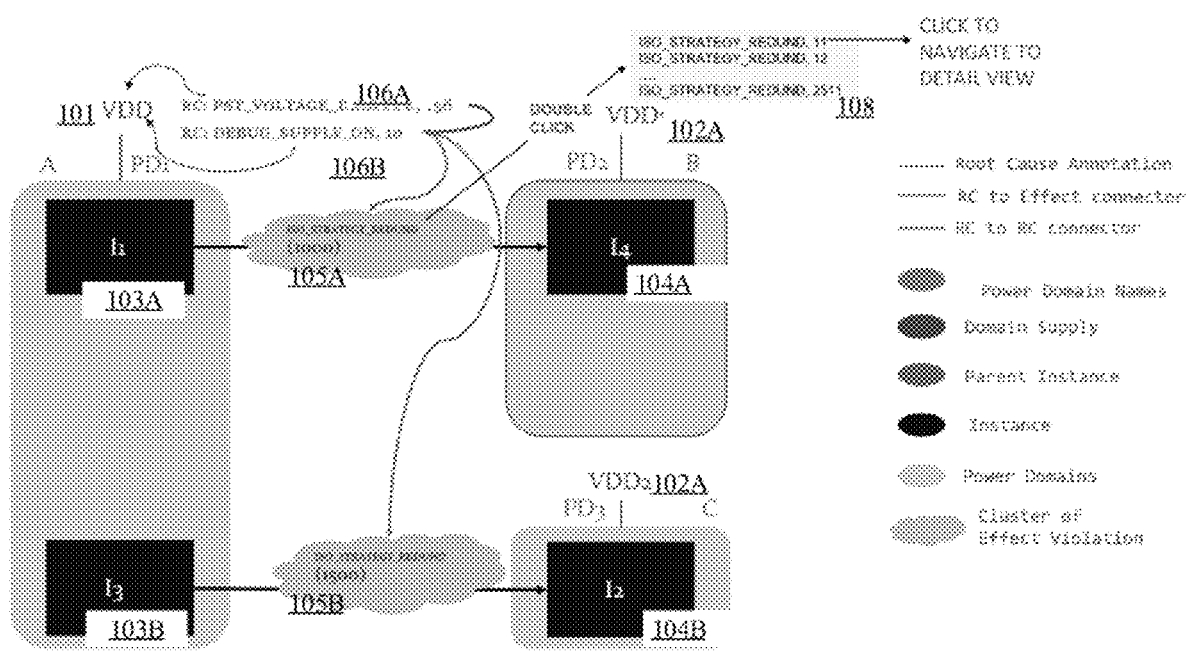
FIG. 18 illustrates an example navigational process from an example power architecture schematic view to a detail view in accordance with certain embodiments.
Figure 19:
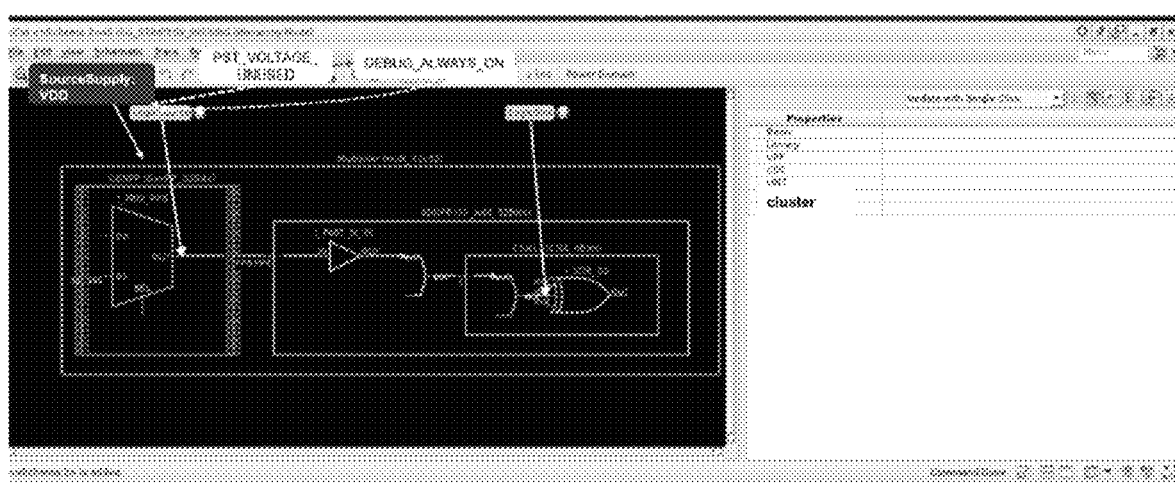
FIG. 19 illustrates an example detail view accessible from a power architecture schematic view in accordance with certain embodiments.
Figure 20:
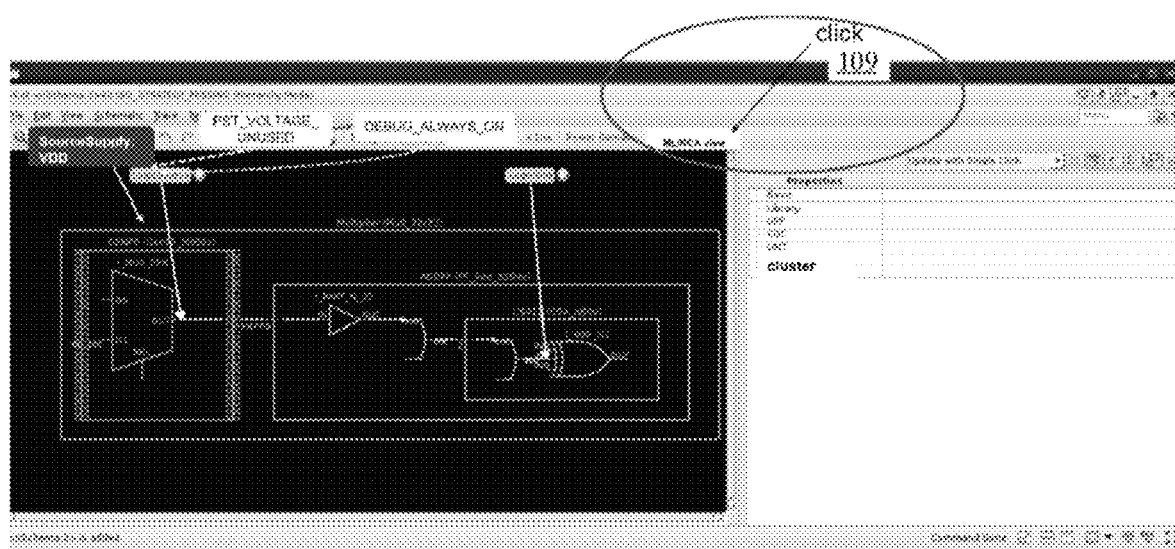
FIG. 20 illustrates an example navigational process from an example detail view to view a power architecture schematic view in accordance with certain embodiments.
Figure 21:
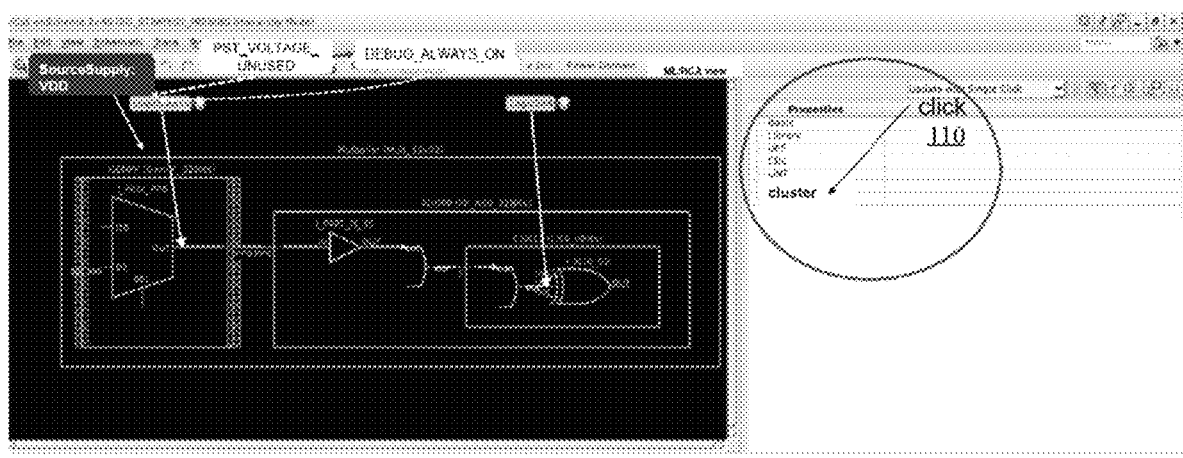
FIG. 21 illustrates an example navigational process from an example detail view to view a power architecture schematic view in accordance with certain embodiments.
Figure 22:
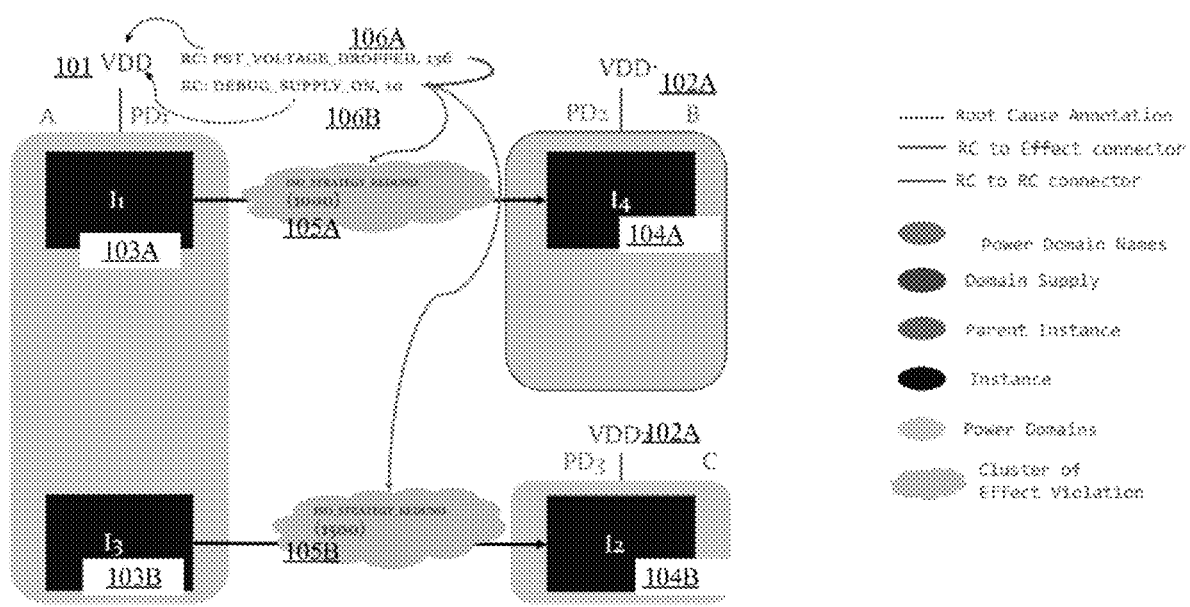
FIG. 22 illustrates an example power architecture schematic view accessible from a detail view in accordance with certain embodiments.

Moreover, to provide users with highly detailed access relating to the violations reflected within the displayed power architecture schematic view, the power architecture schematic view is integrated with detailed views such as those discussed above. The power architecture schematic view shows the hierarchical relationship between various root-cause and effect violations of the DUT. The power architecture schematic view indicates how a cluster of effect violations on a high-level path is caused by one or more root causes. Due to the large volume of effect violations that may be present within certain IC designs, individual violations are not annotated on the power architecture schematic view, and instead a hyperlink is generated by the IC design tool for integration within one or more displayed interactive elements of the power architecture schematic view that enables a user to quickly access a related detailed view for specific violations reflected within the power architecture schematic view. FIG. 17 illustrates an example regarding how additional details may be accessed from a displayed power architecture schematic view. As shown in the example of FIG. 17, selecting the interactive element 105A corresponding with the link between $I_1$ and $I_4$ causes the IC design tool to display, within a separate visual element 108 within the power architecture schematic view, a detailed listing of effect violations within the violation cluster corresponding with the noted link. Moreover, as illustrated in the example of FIG. 17, the visual display further indicates the root causes (as reflected at 106A and 106B) associated with the cluster of violations, as well as the voltage source impacted by those root causes. As indicated at FIG. 18, selecting an individual violation within the separate visual element 108 causes the IC design tool to display a detail view corresponding to the individual violation. Note that through visual linkages, the power architecture schematic view indicates that "DEBUG_SUPPLY_ON, 10" is indicated as the root cause of the violation cluster noted above, and this root cause impacts the "VDD" power supply. Moreover, the root cause noted above is a secondary root cause, that is itself caused by the primary root cause of "PST_VOLTAGE_DROPPED, 156" (also impacting the "VDD" power supply).

Utilizing the power architecture schematic view, a user may validate a cluster of violations (and determine an appropriate fix for the cluster of violations) by reviewing effect violations within various displayed paths by selecting interactive elements associated with each path to retrieve additional details regarding the violations associated with the selected path. The user may then self-determine a root cause of a selected violation to ensure data displayed and indicative of a root cause of the violation is accurate. Evaluation of a single violation may proceed by selecting an individual violation within a pop-up listing of violations of the high-level, causing the IC design tool to display a detail view of the violation-specific schematic.

FIGS. 18-22 illustrates example navigation between the power architecture schematic view and detail view corresponding with a particular design violation. As shown, selecting a specific violation within a listing of violations within a visual element 108 accessible via the power architecture schematic causes the IC design tool to display a detailed schematic of the design violation, with one or more available links 109-110 to cause the IC design tool to navigate back to the power architecture schematic view.

Computing Components and General Integrated Circuit Design and Fabrication

Figure 23:
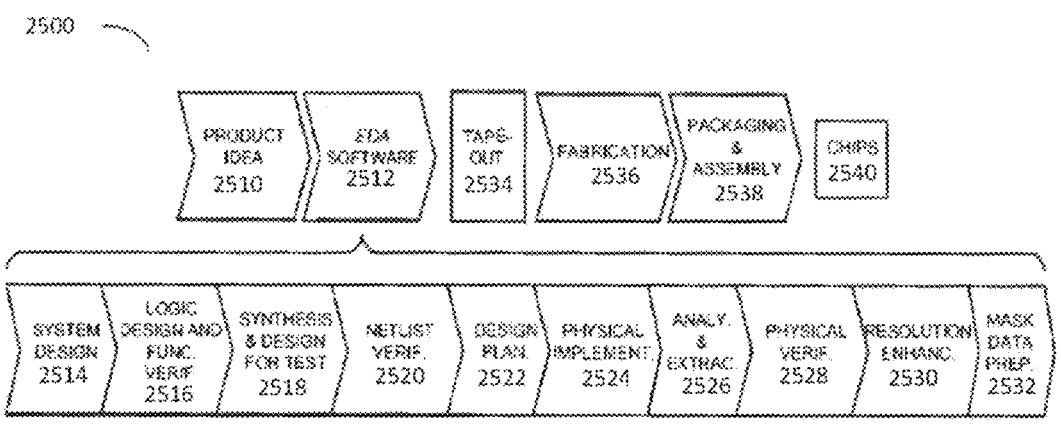
FIG. 23 illustrates various processes performed in the design, verification and fabrication of an IC according to certain embodiments.

FIG. 23 illustrates various processes performed in the design, verification and fabrication of an item of manufacture such as an integrated circuit using software tools with a computer, and possibly special hardware-assisted tools, to transform and verify design data and instructions that represent the integrated circuit. These processes start with the generation of a product idea 2510 with information supplied by a user, information which is transformed during a process to create an item of manufacture (referred to herein as a design or device) that uses an EDA software tool 2512, which may also be signified herein as EDA software, as a design tool, or a verification tool. When the design is finalized, it can be taped-out 2534, which typically is when artwork (e.g., geometric patterns) for the integrated circuit is sent to a fabrication facility, to fabricate the mask set, which is then used for fabricating the integrated circuit. After tape-out, a semiconductor die is fabricated 136 and packaging and assembly processes 2538 are performed, which result in the finished integrated circuit 140 which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most users start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses an EDA software tool 2512 includes tools 2514-2532, which are described below. This design flow description is for illustration purposes only and is not meant to limit the present disclosure. For example, an actual integrated circuit design may require a user to perform the design operations in a different sequence than the sequence described herein.

During system design 2514, a user describes the functionality to be manufactured. The user can also perform what-if planning to refine the functionality and to check costs, etc. Hardware-software architecture partitioning can occur at this stage. Exemplary EDA software products from Synopsys, Inc. of Mountain View, Calif., that can be used at this stage include: Model Architect, Saber, System Studio, and Designware products.

During logic design and functional verification 2516, modules in the circuit are specified in one or more hardware description languages, or HDLs, and the design in HDL is checked for functional accuracy, that is, to match the requirements of the specification of the circuit or system being designed. More specifically, the design is checked to ensure that it produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu® and Protolink® (RTM="Registered Trademark").

During logic synthesis and design for test 2518, HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification 2520, the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning 2522, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation 2524, the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction 2526, the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification 2528, the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement 2530, geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation 2532, the 'tape-out' data is used to produce lithography masks that are used to produce finished integrated circuits. Exemplary EDA software products from Synopsys, Inc. of Mountain View, Calif. that can be used at this stage include the CATS family of products.

For all of the above mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software tool 2512.

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

Figures 24A, 24B, 24C:
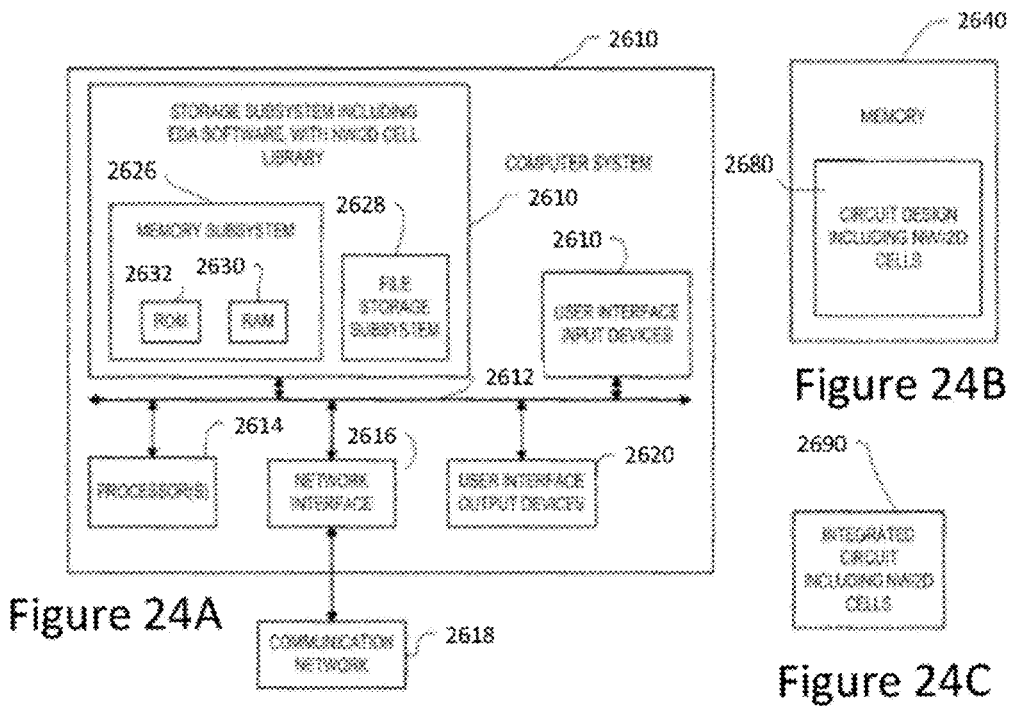
FIG. 24A is a simplified block diagram of a computer system usable in accordance with certain embodiments.
FIG. 24B is a simplified block diagram of a memory usable in accordance with certain embodiments.
FIG. 24C is a simplified block diagram of an integrated circuit in accordance with certain embodiments.

FIGS. 24A, 24B and 24C are simplified block diagrams of a computer system suitable for use with embodiments of the technology, as well as circuit design and circuit embodiments of the technology.

In FIG. 24A, computer system 2610 typically includes at least one computer or processor 2614 which communicates with a number of peripheral devices via bus subsystem 2612. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 2624, including a memory subsystem 2626 and a file storage subsystem 2628, user interface input devices 2622, user interface output devices 2620, and a network interface subsystem 2616. The input and output devices allow user interaction with computer system 2610.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions (sequential or otherwise) that specify actions to be taken by that machine.

The computer system 2610 typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Embodiments and/or examples of the present disclosure are neither limited to conventional computer applications nor the programmable apparatus that run them. For example, the embodiments and/or examples of what is claimed can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 2610 depicted in FIG. 24A is intended only as one example for purposes of illustrating the preferred embodiments. Many other configurations of computer system 2610 are possible having more or less components than the computer system depicted in FIG. 24A.

Network interface subsystem 2616 provides an interface to outside networks, including an interface to communication network 2618, and is coupled via communication network 2618 to corresponding interface devices in other computer systems or machines. Communication network 2618 may include many interconnected computer systems, machines and communication links. These communication links may be wireline links, optical links, wireless links, or any other devices for communication of information. Communication network 2618 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 2622 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 2610 or onto communication network 2618. User interface input devices typically allow a user to select objects, icons, text and the like that appear on some types of user interface output devices, for example, a display subsystem.

User interface output devices 2620 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 2610 to the user or to another machine or computer system.

Memory subsystem 2626 typically includes a number of memories including a main random-access memory (RAM) 2630 (or other volatile storage device) for storage of instructions and data during program execution and a read only memory (ROM) 2632 in which fixed instructions are stored. File storage subsystem 2628 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 2628.

Bus subsystem 2612 provides a device for letting the various components and subsystems of computer system 2610 communicate with each other as intended. Although bus subsystem 2612 is shown schematically as a single bus, alternative embodiments of the bus subsystem may use multiple busses. For example, RAM-based main memory can communicate directly with file storage systems using Direct Memory Access (DMA) systems.

FIG. 24B depicts a memory 2640 such as a non-transitory, computer readable data and information storage medium associated with file storage subsystem 2628, and/or with network interface subsystem 2616, and can include a data structure specifying a circuit design. The memory 2640 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 24C signifies an integrated circuit 2690 created with the described technology that includes one or more cells selected, for example, from a cell library.

The present embodiments and/or examples described herein may include and/or use a processor. As used herein, the term 'processor' signifies a tangible data and information processing device that physically transforms data and information, typically using a sequence of transformations (also referred to as 'operations'). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements.

The processor can be electronic, for example, including digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For data and information structured in binary form, any processor that can transform the data and information using the AND, OR and NOT logical operations (and their derivatives, such as the NAND, NOR, and XOR operations) can transform the data and information using any function of Boolean logic. A processor such as an analog neural network processor can also transform data and information non-digitally. There is no scientific evidence that any of these processors are processing, storing and retrieving data and information, in any manner or form equivalent to the bioelectric structure of the human brain.

The one or more processors may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).)

As used herein, the term 'module' signifies a tangible data and information processing device that typically is limited in size and/or complexity. For example, the term 'module' can signify one or more methods or procedures that can transform data and information. The term 'module' can also signify a combination of one or more methods and procedures in a computer program. The term 'module' can also signify a small network of digital logic devices, in which interconnections of the logic devices give structure to the network. Methods and procedures including a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs), Random Access Memories (RAMs) or microprocessors. A module is configured to process data and information, typically using a sequence transformations (also referred to as 'operations') applied to the data and information (or in the case of ROMs and RAMS, transforming data and information by using the input information as an address for memory that stores output data and information), to perform aspects of the present embodiments and/or examples of the present disclosure.

Modules that are temporarily configured need not be configured at any one instance in time. For example, a processor including one or more modules can have the modules configured at different times. The processor can include a set of one or more modules at one instance of time, and to include a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term 'algorithm' signifies a process including a sequence or set of operations or instructions that a module can use to transform data and information to achieve a result. A module can include one or more algorithms. As used herein, the term 'thread' refers to a sequence of instructions that can include a subset of the instructions of an entire process or algorithm. A process or algorithm can be partitioned into multiple threads that can be executed in parallel.

As used herein, the term 'computer' includes at least one information processor that, for example, can perform certain operations such as (but not limited to) the AND, OR and NOT logical operations using electronic gates that can include transistors, with the addition of memory (for example, memory based on flip-flops using the NOT-AND or NOT-OR operation). Such a processor is said to be Turing-complete or computationally universal. A computer, whether or not it is a digital computer, typically includes many modules.

As used herein, the term 'software' or 'program' signifies one or more algorithms and data structures that configure a processor for use in the present embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term 'programming language' signifies a grammar and syntax for specifying sets of instruction and data that include software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network. An EDA software system, such as EDA software tool 2512 depicted in FIG. 23, typically includes an emulation system 116 to verify the functionality of the circuit design. FIG. 24A depicts a typical emulation system which includes a host computer system (often part of an EDA system) and an emulator system (typically a set of programmable devices such as Field Programmable Gate Arrays (FPGAs)). A host system generates data and information, typically using a compiler, to configure the emulator to emulate a circuit design. One of more circuit designs to be emulated are referred to as a DUT (Design Under Test). The emulator is a hardware system that emulates a DUT, for example, to use the emulation results for verifying the functionality of the DUT. One example of an emulation system that can be used for the embodiments disclosed herein is the ZeBus Server available from Synopsys, Inc.

A host system can include one or more processors. In the embodiment where the host system includes multiple processors, the functions described herein as being performed by the host system may be distributed among the multiple processors.

The host system typically includes a compiler that processes code written in a hardware description language that represents a DUT, producing data (typically binary) and information that is used to configure the emulation system to emulate the DUT. The compiler may transform, change, reconfigure, add new functions to, and/or control the timing of the DUT.

The host system and emulator exchange data and information using signals carried by an emulation connection. The connection can be one or more electrical cables, for example, cables with pin configurations compatible with the RS232 or USB protocols. The connection can be a wired communication medium or network, such as a local area network, or a wide area network such as the Internet. The connection can be a wireless communication medium or a network with one or more points of access, using a wireless protocol such as Bluetooth® or IEEE 802.11. The host system and emulator can exchange data and information through a third device, such as a network server.

The emulator includes multiple FPGAs (or other programmable devices). Each FPGA can include one or more FPGA interfaces through which the FPGA is connected to other FPGAs of the emulator (and potentially other emulator hardware components), in order for the FPGAs to exchange signals. An FPGA interface may also be referred to as an input/output pin or an FPGA pad. While some embodiments disclosed herein make use of emulators including FPGAs, other embodiments can include other types of logic blocks instead of, or along with, the FPGAs for emulating DUTs, for example, custom FPGAs, specialized ASICs for emulation or prototyping, memories, and input/output devices.

A programmable device may include an array of programmable blocks and a hierarchy of reconfigurable interconnects that allow the programmable blocks to be connected to each other according to the descriptions in the HDL code. Each of the programmable blocks can be configured to perform complex combinational functions, or merely simple logic functions, such as AND, and XOR.

In many FPGAs, the blocks also include memory elements, which may be simple latches, flip-flops or more complex blocks of memory. Depending on the length of the interconnections between different logic blocks, signals may arrive at input terminals of the blocks at different times.

Programmable processors may be placed into one or more hardware boards. Many of such boards may be placed into a hardware unit. The boards within a unit may be connected using the backplane of the unit or any other types of connections. In addition, multiple hardware units may be connected to each other by cables or any other means to form a multi-unit system. In general, the hardware emulation or prototype system 202 may be formed using a single board, a single unit with multiple boards, or with multiple units without departing from the teachings of the present disclosure.

For a DUT that is to be emulated, the emulator receives from the host system one or more bit files including a description of the DUT. The bit files further specify partitions of the DUT created by the host system with trace and injection logic, mappings of the partitions to the FPGAs of the emulator, and design constraints. Based on the bit files, the emulator configures the FPGAs to perform the functions of the DUT. With some emulators, one or more FPGAs of an emulator already have the trace and injection logic built into the silicon of the FPGA. For this type of emulator, the FPGAs don't have to be configured by the host system to emulate trace and injection logic.

The host system receives (e.g., from a user) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in a HDL, the host system synthesizes the DUT description to create a gate level netlist based on the DUT description. A host system can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system maps each partition to an FPGA of the emulator. With some emulators, the trace and injection logic is only included in select partitions for a group of FPGAs.

The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic was incorporated, the bit files also describe the incorporation of the logic. The bit files may also include place and route information and design constraints. The host system stores the bit files and also stores for components of the DUT information describing which FPGAs are to emulate each component of the DUT (to which FPGAs each component is mapped).

Upon request, the host system transmits the bit files to the emulator. The host system instructs the emulator to emulate the DUT. During emulation of the DUT or at the end of the emulation, the host system receives emulation results from the emulator through the emulation connection. Emulation results are data and information generated by the emulator based on the emulation of the DUT. The emulation results include interface signals (states of interface signals) traced by the trace and injection logic of each FPGA. The host system can stores the emulation results, or transmit them to another processing system.

After emulation of the DUT, a user may request to debug a component of the DUT. If such a request is made the user may provide a time period of the emulation to debug. The host system identifies which FPGAs are configured to emulate the component based on the stored information. The host system retrieves stored interface signals associated with the time period and traced by the trace and injection logic of each identified FPGA. The host system instructs the emulator to re-emulate the identified FPGAs, either one by one, multiple at a time, or altogether. The host system transmits the retrieved interface signals to the emulator in order to re-emulate the component for the time period. The trace and injection logic of each identified FPGA injects its respective interface signals received from the host system into the logic of the DUT mapped to the FPGA. In case of multiple re-emulations of an FPGA, the results may be merged all together to have a full debug view.

The host system receives from the emulator signals traced by logic of the identified FPGAs during the re-emulation of the component. The host system stores the signals received from the emulator. The signals traced during the re-emulation can have a higher sampling rate than during the initial emulation. For example, in the initial run a traced signal may include a saved hardware state every X milliseconds. However, in the re-emulation the traced signal may be include a saved hardware state every Y milliseconds, where Y is less than X. If the user requests to view a waveform of a signal traced during the re-emulation, the host system can retrieve the stored signal and display a plot of the signal (generates a waveform of the signal). Afterwards the user can, for example, request to re-emulate the same component but for a different time period or to re-emulate another component.

A host system typically includes at least seven sub-systems: a design synthesizer, a mapping module, a run time module, a results module, a debug module, a waveform module, and a storage module. Each of these sub-systems may be embodied as hardware, software, firmware, or a combination thereof. Together these components configure the emulator, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions, it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator. The mapping module performs the partitioning and mapping using design rules, design constraints (e.g., timing or logic constraints), and information about the emulator. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator. The bit files may include additional information, such as constraints of the DUT, and routing information of connections between FPGAs and connections within each FPGA. The mapping module can generate a bit file for each partition of the DUT, which can be stored in the storage module. Upon request from a user, the mapping module transmits the bit files to the emulator, which the emulator uses to configure the FPGAs to emulate the DUT.

If the emulator includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator. The run time module may cause the emulator to start or stop executing an emulation. Additionally, the run time module may provide input signals/data to the emulator. The input signals may be provided directly to the emulator through the connection or indirectly through other input signal devices. For example, the host system with the run time module may control an input signal device to provide the input signals to the emulator. The input signal device may be, for example, a test board (directly or through cables), signal generator, another emulator, or another host system.

The results module processes emulation results generated by the emulator. During emulation and/or after completing the emulation, the results module receives emulation results from the emulator generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal includes multiple hardware states and each hardware state is associated with a time of the emulation. The results module stores the traced signals received in the storage module. For each stored signal, the results module can store information indicating which FPGA generated the traced signal.

The debug module allows users to debug DUT components. After the emulator has emulated a DUT and the results module has received the interface signals traced by the trace and injection logic during the emulation, a user may request to debug a component of the DUT by re-emulating the component for a specific time period. In a request to debug a component, the user identifies the component and indicates a time period of the emulation to debug. The user's request can also include a sampling rate that indicates how often hardware states should be saved by logic that traces signals.

The debug module identifies the one or more FPGAs of the emulator that are configured to emulate the component based on the information stored by the mapping module in the storage module. For each identified FPGA, the debug module retrieves, from the storage module, interface signals traced by the trace and injection logic of the FPGA during the time period indicated by the user (i.e., retrieve hardware states traced by the trace and injection logic that are associated with the time period).

The debug module transmits the retrieved interface signals to the emulator. The debug module instructs the debug module to run the identified FPGAs and for the trace and injection logic of each identified FPGA to inject its respective traced signals into logic of the FPGA in order to re-emulate the component for the requested time period. The debug module can also transmit the sampling rate provided by the user to the emulator so that the tracing logic traces hardware states at the proper intervals.

To debug the component, the emulator only has to run the FPGAs to which the component has been mapped. Additionally, the re-emulation of the component does not have to start from the beginning, but can start at any point desired by the user.

For an identified FPGA, the debug module can transmit instructions to the emulator to load multiple emulator FPGAs with the same configuration of the identified FPGA. The debug module additionally instructs the emulator to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA and each of the FPGAs runs a subset of the cycles, it may only take a few minutes for the FPGAs to collectively run all of the cycles.

A user may identify a hierarchy or a list of DUT signals to re-emulate. To enable this, the debug module determines the FPGA needed to emulate the hierarchy or list of signals, retrieves the necessary interface signals and transmits the retrieved interface signals to the emulator for re-emulation. Hence, a user can identify any element (e.g., component or signal) of the DUT to debug/reemulate.

The waveform module generates waveforms based on traced signals. If a user requests to view a waveform of a signal traced during an emulation run, the host system retrieves the signal from the storage module. The waveform module displays a plot of the signal to the user. For one or more signals, when the signals are received from the emulator, the waveform module can automatically generate the plots of the signals.

CONCLUSION

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of the present disclosure includes a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of present embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the present disclosure and its useful application, thereby enabling others skilled in the art to understand how various embodiments and variations are suited to the particular uses signified.

The foregoing Detailed Description of the present embodiments, and/or examples of the present disclosure has been provided for the purposes of illustration and description. It is not intended to be exhaustive nor to limit the present disclosure to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the present embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the present disclosure be defined and judged by the following claims and equivalents. The following claims are hereby incorporated into the Detailed Description, with each claim standing on its own as a separate embodiment. Disclosed embodiments can be described with more features than are expressly recited in the claims.

That which is claimed:

1. A system for generating a cluster-based power architecture interface, the system comprising:
a memory storage device;
a processor configured to:
receive design data for an integrated circuit (IC) design;
determine, based at least in part on the design data, power characteristic data for the IC design, wherein the power characteristic data identifies a power intent hierarchy for the IC design and violations present within the IC design;
generate within a graphical user interface (GUI), display components corresponding to individual components encompassed within the power intent hierarchy;
generate, within the GUI and based at least in part on the design data, one or more graphical links between displayed components;
generate, based at least in part on the power characteristic data for the IC design, one or more violation clusters each comprising a plurality of design violations for the IC design, wherein design violations within each of the one or more violation clusters are characterized as having at least one shared root cause;
associate the one or more violation clusters with the one or more graphical links;
overlay a plurality of interactive elements over the GUI, wherein the plurality of interactive elements comprise:
at least one interactive link element providing data indicative of the one or more violation clusters in association with corresponding ones of the one or more graphical links;
at least one root-cause element corresponding to the at least one shared root cause; and
a graphical association between the at least one interactive link element and the at least one root-cause element to indicate a relationship between the at least one root-cause element and the at least one interactive link element.

2. The system for generating a cluster-based power architecture interface of claim 1, wherein the at least one interactive link element has associated detail data indicative of individual violations within a violation cluster, and wherein the processor is configured to:
upon receipt of input indicating interaction with a first interactive element, display a detail element within the GUI comprising at least a portion of the detail data.

3. The system for generating a cluster-based power architecture interface of claim 2, wherein the detail data comprises a plurality of interactive links associated with individual violations within the violation cluster, and wherein the processor is additionally configured to:
upon receipt of input indicating interaction with an interactive link associated with a first individual violation, display a detail-view GUI providing a violation-specific schematic associated with the first individual violation.

4. The system for generating a cluster-based power architecture interface of claim 1, wherein:
the display components comprise source components and sink components; and
each of the one or more graphical links directly links at least one source component with at least one sink component.

5. The system for generating a cluster-based power architecture interface of claim 1, wherein the at least one root-cause element comprises primary root-cause elements and secondary root-cause elements, and wherein at least one primary root-cause element is visually linked with at least one secondary root-cause element to demonstrate the at least one primary root-cause element being a cause of the at least one secondary root-cause element.

6. The system for generating a cluster-based power architecture interface of claim 1, wherein the GUI comprises the display components in a hierarchical arrangement, wherein display components corresponding to individual components are displayed within one of a common source parent boundary or a common sink parent boundary, and wherein the GUI displays the common source parent boundary and the common sink parent boundary within a common parent boundary.

7. The system for generating a cluster-based power architecture interface of claim 1, wherein:
determining power characteristic data for the IC DUT comprises generating a tabular power characteristic reference table for each violation cluster; and
overlaying a plurality of interactive elements over the GUI comprises generating the at least one interactive link element based at least in part on the tabular power characteristic reference table for each cluster.

8. A computer-implemented method for generating a cluster-based power architecture interface, the method comprising:
receiving, via one or more processors, design data for an integrated circuit (IC) design;
determining, based at least in part on the design data, power characteristic data for the IC design, wherein the power characteristic data identifies a power intent hierarchy for the IC design and violations present within the IC design;
generating within a graphical user interface (GUI), display components corresponding to individual components encompassed within the power intent hierarchy;
generating, within the GUI and based at least in part on the design data, one or more graphical links between displayed components;
generating, based at least in part on the power characteristic data for the IC design, one or more violation clusters each comprising a plurality of design violations for the IC design, wherein design violations within each of the one or more violation clusters are characterized as having at least one shared root cause;
associating the one or more violation clusters with the one or more graphical links;
overlaying a plurality of interactive elements over the GUI, wherein the plurality of interactive elements comprise:
at least one interactive link element providing data indicative of the one or more violation clusters in association with corresponding ones of the one or more graphical links;
at least one root-cause element corresponding to the at least one shared root cause; and
a graphical association between the at least one interactive link element and the at least one root-cause element to indicate a relationship between the at least one root-cause element and the at least one interactive link element.

9. The computer-implemented method for generating a cluster-based power architecture interface of claim 8, wherein the at least one interactive link element has associated detail data indicative of individual violations within a violation cluster, and wherein the method further comprises:
    upon receipt of input indicating interaction with a first interactive element, displaying a detail element within the GUI comprising at least a portion of the detail data.

10. The computer-implemented method for generating a cluster-based power architecture interface of claim 9, wherein the detail data comprises a plurality of interactive links associated with individual violations within the violation cluster, and wherein the method further comprises:
    upon receipt of input indicating interaction with an interactive link associated with a first individual violation, displaying a detail-view GUI providing a violation-specific schematic associated with the first individual violation.

11. The computer-implemented method for generating a cluster-based power architecture interface of claim 8, wherein:
    the display components comprise source components and sink components; and
    each of the one or more graphical links directly links at least one source component with at least one sink component.

12. The computer-implemented method for generating a cluster-based power architecture interface of claim 8, wherein the at least one root-cause element comprises primary root-cause elements and secondary root-cause elements, and wherein at least one primary root-cause element is visually linked with at least one secondary root-cause element to demonstrate the at least one primary root-cause element being a cause of the at least one secondary root-cause element.

13. The computer-implemented method for generating a cluster-based power architecture interface of claim 8, wherein the GUI comprises the display components in a hierarchical arrangement, wherein display components corresponding to individual components are displayed within one of a common source parent boundary or a common sink parent boundary, and wherein the GUI displays the common source parent boundary and the common sink parent boundary within a common parent boundary.

14. The computer-implemented method for generating a cluster-based power architecture interface of claim 8, wherein:
    determining power characteristic data for the IC DUT comprises generating a tabular power characteristic reference table for each violation cluster; and
    overlaying a plurality of interactive elements over the GUI comprises generating the at least one interactive link element based at least in part on the tabular power characteristic reference table for each cluster.

15. A non-transitory computer-readable storage medium comprising executable instructions configured to, when executed by a processor, cause the processor to:
    receive design data for an integrated circuit (IC) design;
    determine, based at least in part on the design data, power characteristic data for the IC design, wherein the power characteristic data identifies a power intent hierarchy for the IC design and violations present within the IC design;
    generate within a graphical user interface (GUI), display components corresponding to individual components encompassed within the power intent hierarchy;
    generate, within the GUI and based at least in part on the design data, one or more graphical links between displayed components;
    generate, based at least in part on the power characteristic data for the IC design, one or more violation clusters each comprising a plurality of design violations for the IC design, wherein design violations within each of the one or more violation clusters are characterized as having at least one shared root cause;
    associate the one or more violation clusters with the one or more graphical links;
    overlay a plurality of interactive elements over the GUI, wherein the plurality of interactive elements comprise:
        at least one interactive link element providing data indicative of the one or more violation clusters in association with corresponding ones of the one or more graphical links;
        at least one root-cause element corresponding to the at least one shared root cause; and
        a graphical association between the at least one interactive link element and the at least one root-cause element to indicate a relationship between the at least one root-cause element and the at least one interactive link element.

16. The non-transitory computer readable medium of claim 15, wherein the at least one interactive link element has associated detail data indicative of individual violations within a violation cluster, and further comprising executable instructions configured to:
    upon receipt of input indicating interaction with a first interactive element, display a detail element within the GUI comprising at least a portion of the detail data.

17. The non-transitory computer readable medium of claim 16, wherein the detail data comprises a plurality of interactive links associated with individual violations within the violation cluster, and further comprising executable instructions configured to:
    upon receipt of input indicating interaction with an interactive link associated with a first individual violation, display a detail-view GUI providing a violation-specific schematic associated with the first individual violation.

18. The non-transitory computer readable medium of claim 15, wherein:
    the display components comprise source components and sink components; and
    each of the one or more graphical links directly links at least one source component with at least one sink component.

19. The non-transitory computer readable medium of claim 15, wherein the at least one root-cause element comprises primary root-cause elements and secondary root-cause elements, and wherein at least one primary root-cause element is visually linked with at least one secondary root-cause element to demonstrate the at least one primary root-cause element being a cause of the at least one secondary root-cause element.

20. The non-transitory computer readable medium of claim 15, wherein the GUI comprises the display components in a hierarchical arrangement, wherein display components corresponding to individual components are displayed within one of a common source parent boundary or a common sink parent boundary, and wherein the GUI displays the common source parent boundary and the common sink parent boundary within a common parent boundary.

21. The non-transitory computer readable medium of claim 15, wherein:
   determining power characteristic data for the IC DUT comprises generating a tabular power characteristic reference table for each violation cluster; and
   overlaying a plurality of interactive elements over the GUI comprises generating the at least one interactive link element based at least in part on the tabular power characteristic reference table for each cluster.

* * * * *